US011548373B1

(12) United States Patent
Kurczewski et al.

(10) Patent No.: US 11,548,373 B1
(45) Date of Patent: Jan. 10, 2023

(54) THERMAL MANAGEMENT FOR A DELIVERY AUTONOMOUS GROUND VEHICLE

(71) Applicant: Amazon Technologies, Inc., Seattle, WA (US)

(72) Inventors: Nicolas Kurczewski, Seattle, WA (US); Ennio Claretti, Seattle, WA (US); Nicolas Hostein, Seattle, WA (US); Brett Skaloud, Seattle, WA (US); Andrew Stubbs, Seattle, WA (US); Kyle Washabaugh, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 1037 days.

(21) Appl. No.: 16/214,791

(22) Filed: Dec. 10, 2018

(51) Int. Cl.
| | |
|---|---|
| *B60K 11/08* | (2006.01) |
| *G05D 1/02* | (2020.01) |
| *G05B 19/418* | (2006.01) |
| *B60P 3/00* | (2006.01) |
| *A47J 43/00* | (2006.01) |

(52) U.S. Cl.
CPC .............. *B60K 11/08* (2013.01); *B60P 3/007* (2013.01); *G05B 19/41895* (2013.01); *G05D 1/021* (2013.01); *A47J 43/00* (2013.01); *G05B 2219/31003* (2013.01)

(58) Field of Classification Search
CPC ... B60K 11/08; B60P 3/007; G05B 19/41895; G05B 2219/31003; G05D 1/021; A47J 43/00; B60H 2001/00614; B60H 1/00642; B60H 1/00564; B60H 1/00821; G06F 1/206; G06F 1/20
See application file for complete search history.

(56) References Cited

U.S. PATENT DOCUMENTS

| | | | | |
|---|---|---|---|---|
| 4,698,775 | A * | 10/1987 | Koch | G05D 1/0272 414/940 |
| 6,940,716 | B1 * | 9/2005 | Korinsky | G06F 1/20 361/679.48 |
| 11,104,294 | B1 * | 8/2021 | Skaloud | B62D 24/04 |
| 11,164,273 | B2 * | 11/2021 | Heinla | G06Q 10/0832 |
| 2013/0305484 | A1 * | 11/2013 | Dyson | A47L 9/1641 15/353 |
| 2015/0006005 | A1 * | 1/2015 | Yu | G06Q 50/28 701/22 |
| 2016/0327383 | A1 * | 11/2016 | Becker | G01B 11/005 |
| 2018/0024554 | A1 * | 1/2018 | Brady | G06Q 10/0833 701/23 |
| 2019/0033883 | A1 * | 1/2019 | Ferguson | G06Q 30/0631 |
| 2021/0070339 | A1 * | 3/2021 | Delgatty | B62B 3/008 |

(Continued)

FOREIGN PATENT DOCUMENTS

| | | | | |
|---|---|---|---|---|
| CN | 207354781 | U * | 5/2018 | |
| JP | 2009176845 | A * | 8/2009 | H01L 23/467 |

*Primary Examiner* — James A Shriver, II
*Assistant Examiner* — Michael T. Walsh
(74) *Attorney, Agent, or Firm* — BakerHostetler

(57) ABSTRACT

A chassis and skin of a delivery Autonomous Ground Vehicle include discrete upper and lower thermal management systems. The lower thermal management system is indirect, as is moves air through a closed duct that is in contact with high-heat dissipating components via heat sinks. The upper thermal management system is direct, as it moves air into the interior cavity of the AGV to cool sensors and other electronic equipment.

20 Claims, 29 Drawing Sheets

(56) References Cited

U.S. PATENT DOCUMENTS

| | | | | |
|---|---|---|---|---|
| 2021/0094506 | A1* | 4/2021 | Baker | G06Q 50/28 |
| 2021/0138887 | A1* | 5/2021 | Shih | G07C 5/0808 |
| 2021/0339993 | A1* | 11/2021 | Matsuda | B66F 9/063 |
| 2022/0097588 | A1* | 3/2022 | Ulsamer | B66C 1/36 |
| 2022/0106001 | A1* | 4/2022 | Takasugi | B62D 57/028 |
| 2022/0111522 | A1* | 4/2022 | Ko | B25J 9/1694 |

* cited by examiner

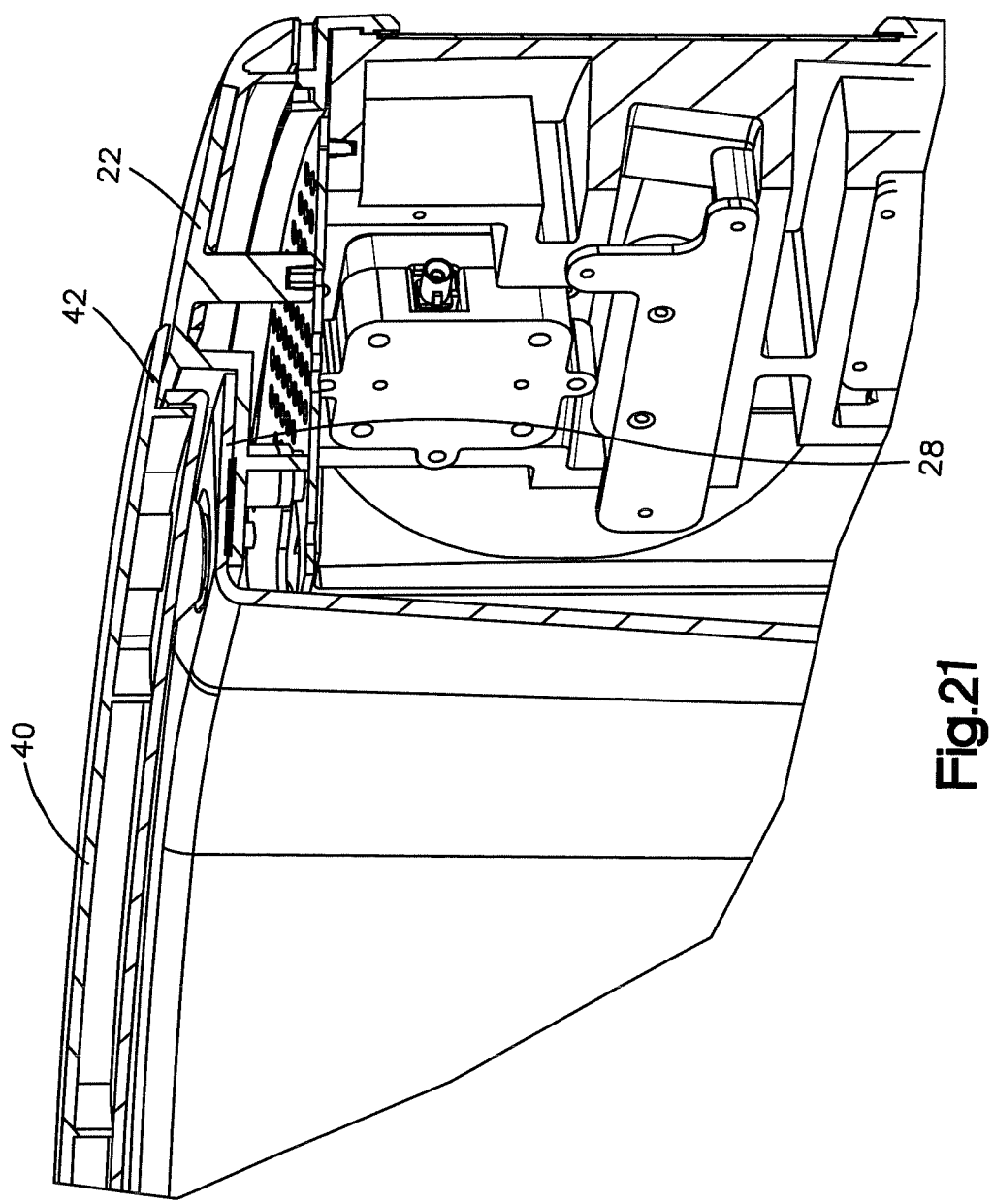

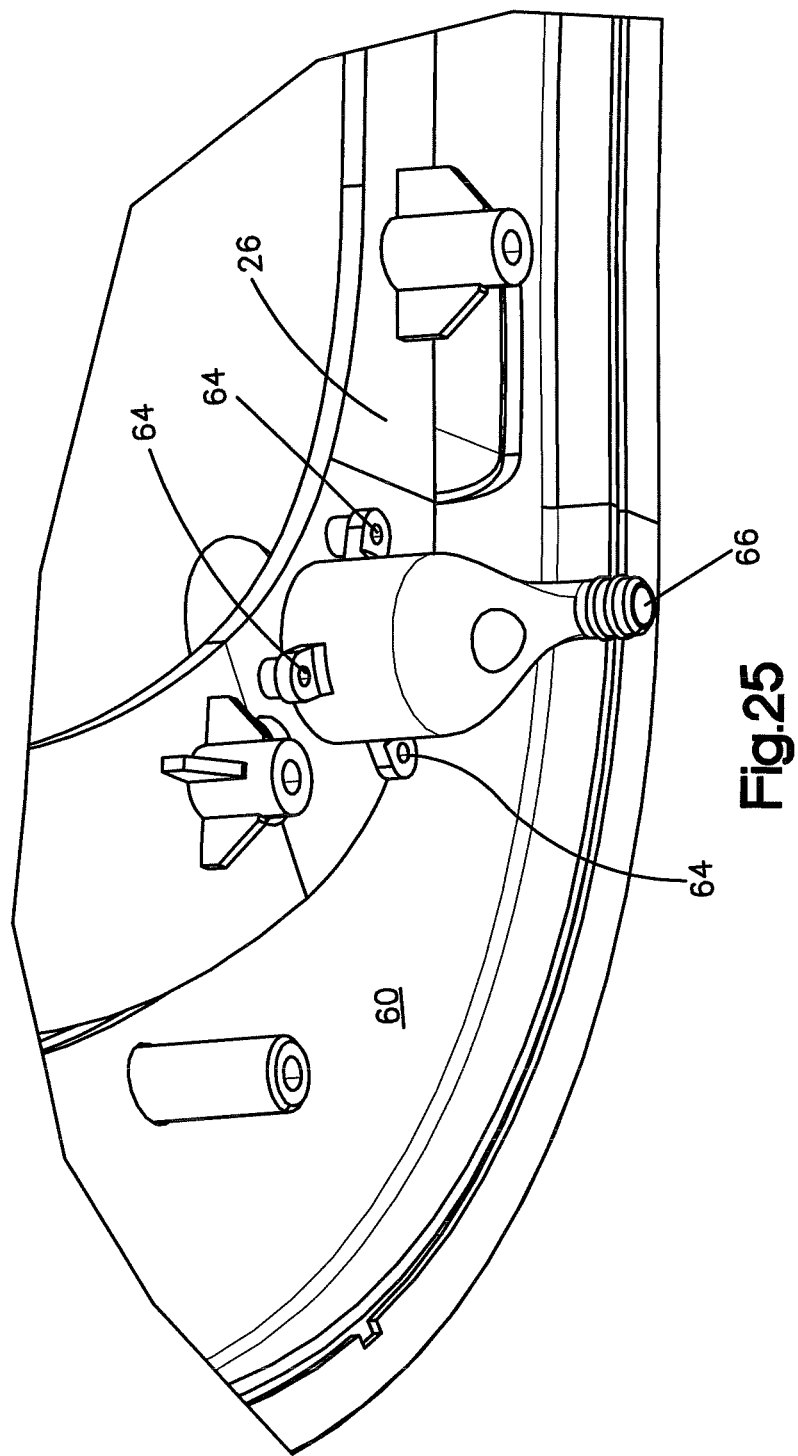

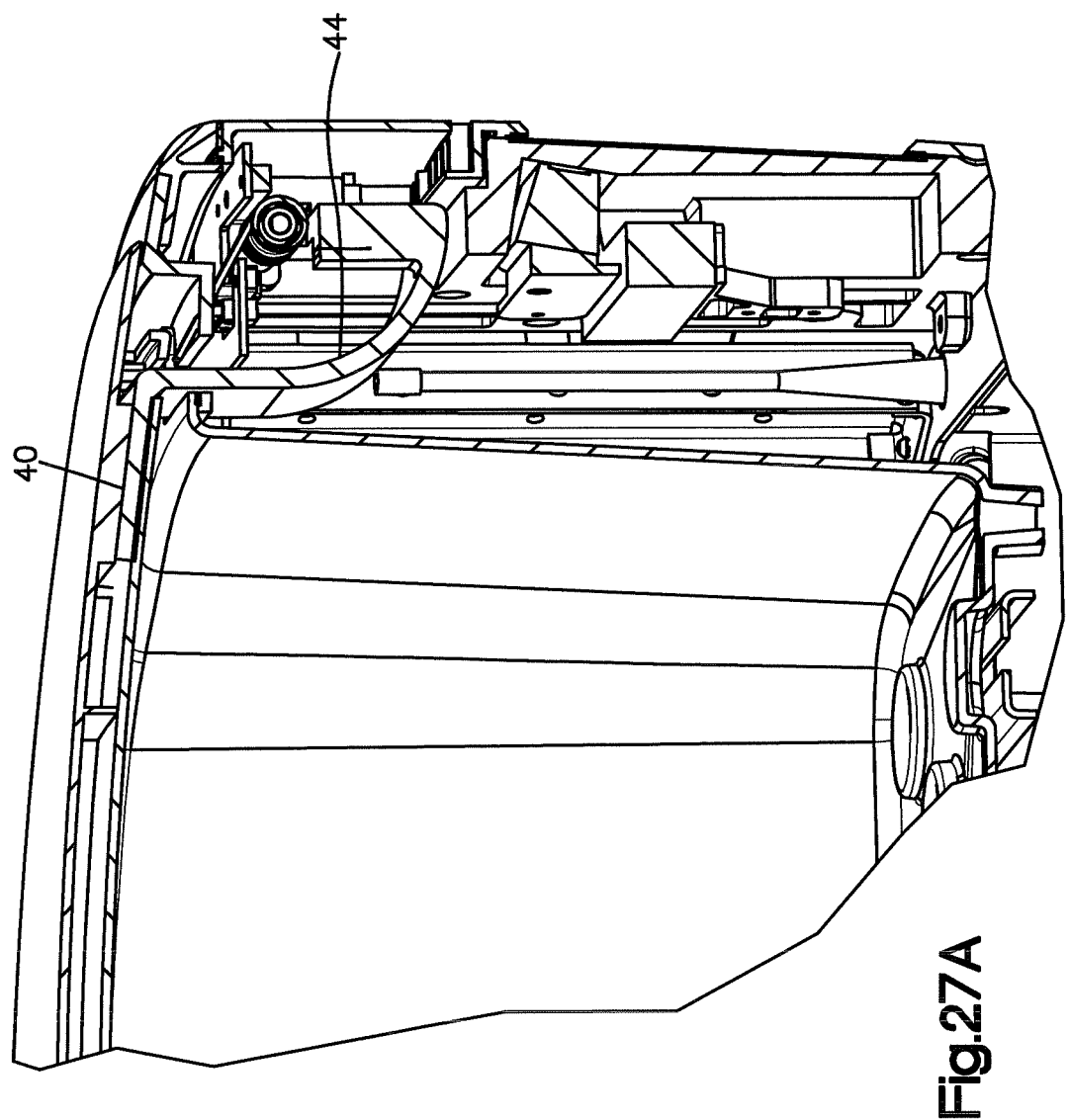

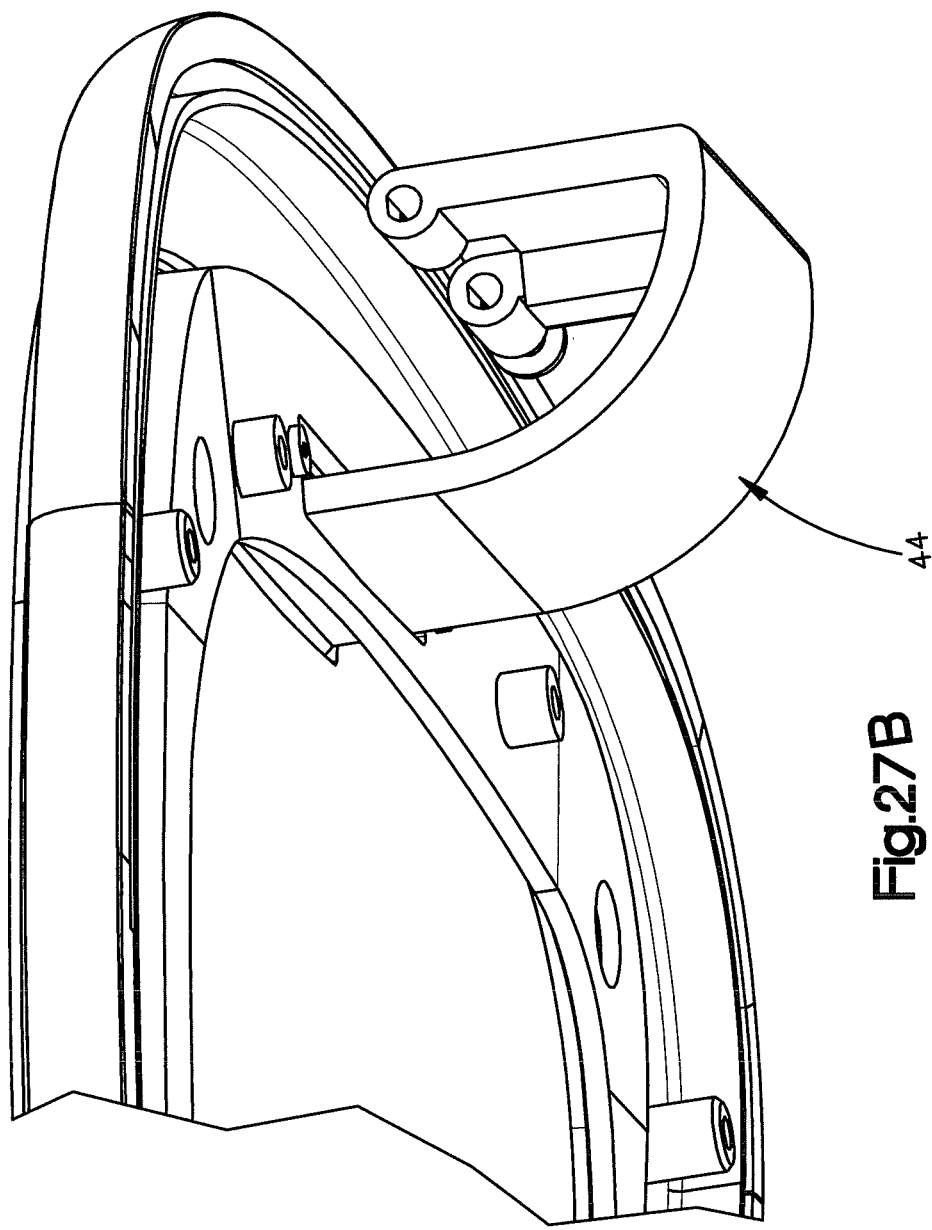

THERMAL MANAGEMENT FOR A DELIVERY AUTONOMOUS GROUND VEHICLE

BACKGROUND

The present invention relates to autonomous ground vehicles, and more particularly to thermal management systems, and methods relating to delivery AGVs.

Delivery robots have been proposed and disclosed for delivery of various items to an end-customer or business. A typical delivery robot is moveable under its own power and includes a housing that covers or contains a payload, which can include groceries, take-out food orders, and the like. Delivery robots can, in many circumstances, be exposed to weather, such as rain, which can harm electronic parts and electric motors, in addition to harming the payload.

Delivery AGVs often are propelled by battery powered, motorized wheels to move packages or other items to a home or business. At times, it is expected that the cargo area of a delivery AGVs will be exposed to rain or other precipitation, such as when a customer opens a lid to access the package while exposed to rain. At other times, the delivery AGV will operate in a driving rainstorm and/or drive through puddles and be exposed to other splashing water.

The battery powered components of an AGV, such as motor controllers and voltage regulators, give off heat. Some other electronic components, such as sensors, do not produce as much heat as the heat-generating components for powering the electric drive motors.

BRIEF DESCRIPTION OF THE DRAWINGS

FIG. 21 is an enlarged cross section view of the lid and upper portion of the AGV of FIG. 19;

FIG. 25 is a perspective view of an underside of a portion of the lip of the AGV, illustrating a mount for a lid hold-down device;

FIG. 27A is a perspective view of a drain pan about a hinge mechanism;

FIG. 27B is a perspective view of the hinge mechanism with other parts removed for clarity;

DETAILED DESCRIPTION OF ILLUSTRATIVE EMBODIMENTS

Figure 1:
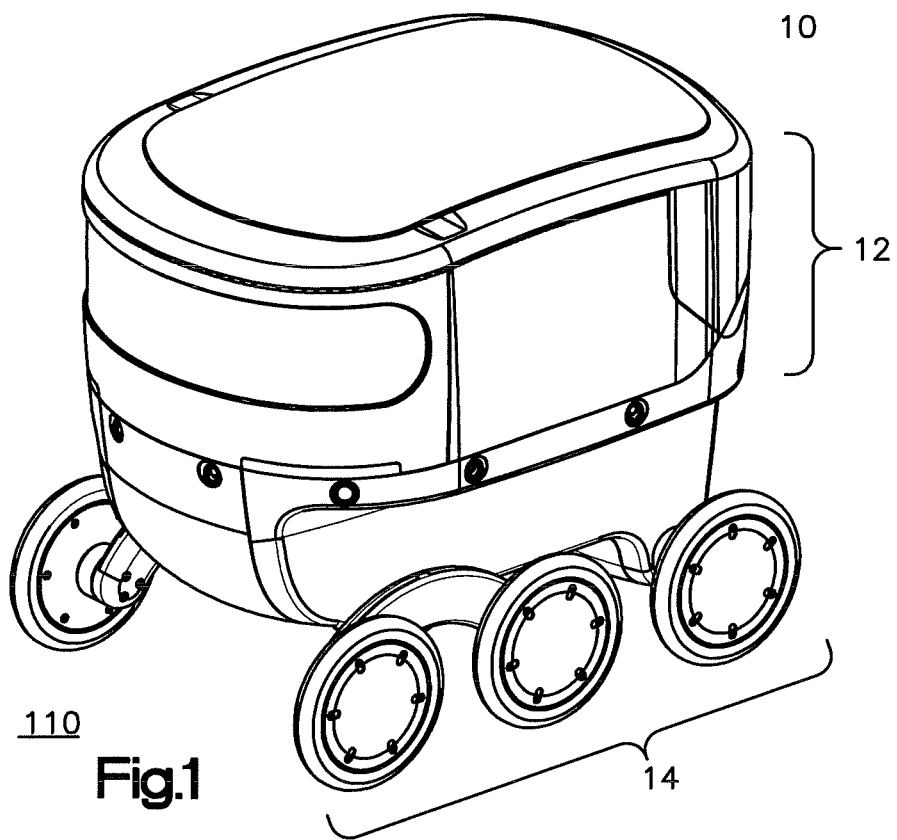
FIG. 1 is a perspective view of a delivery AGV illustrating aspects of the present invention.
Figure 2:
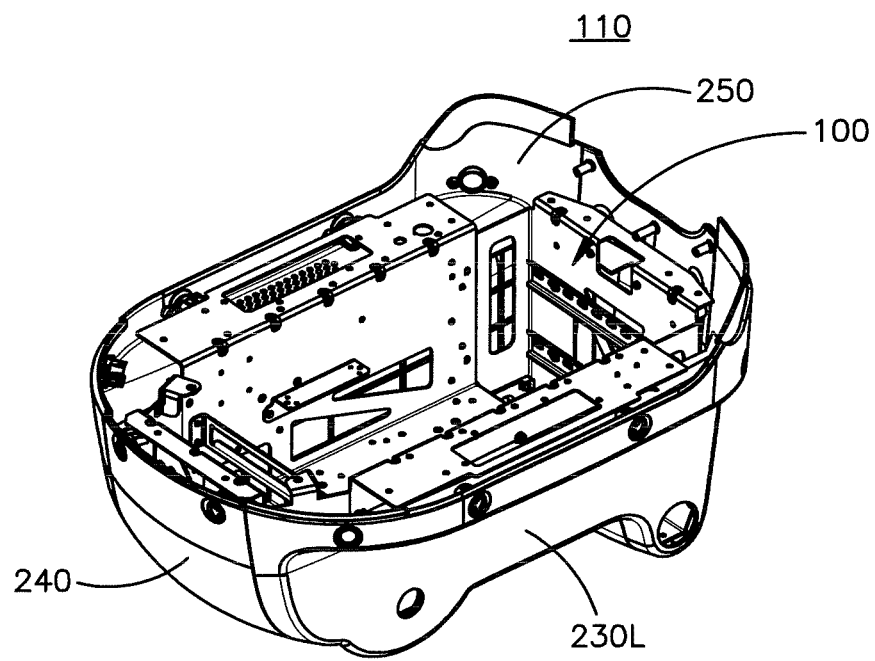
FIG. 2 is a top, front perspective view of a chassis and skin combination of FIG. 1, with its upper portion (including cargo bay and sensor bays) and drive assemblies removed.
Figure 3:
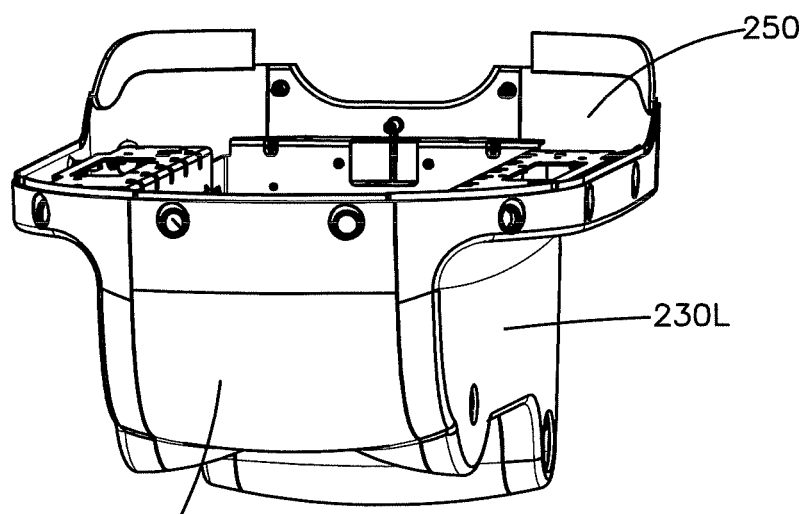
FIG. 3 is another top perspective view of the structure of FIG. 2.
Figure 4:
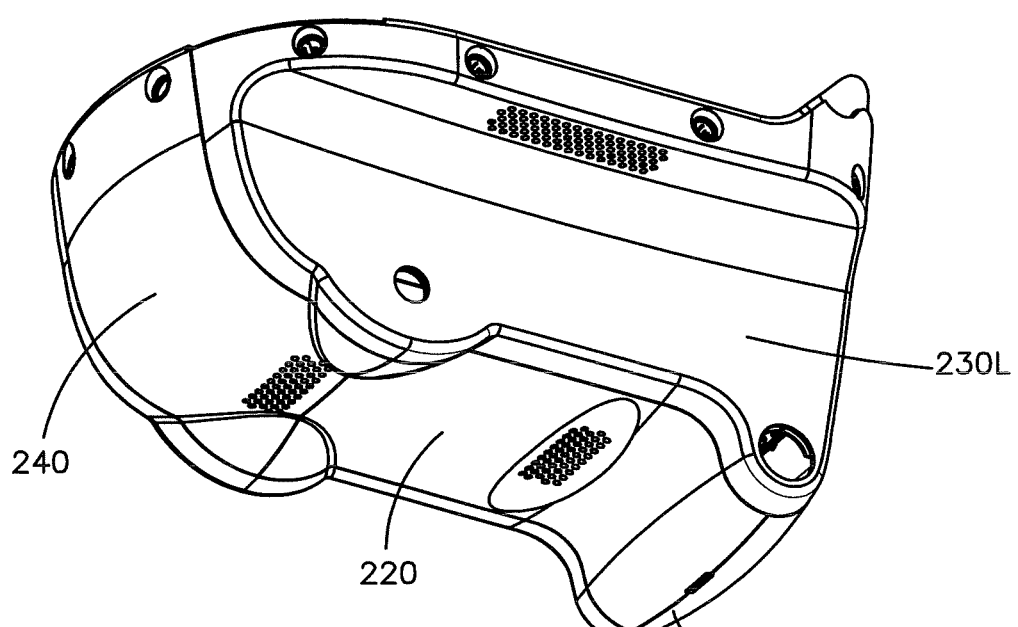
FIG. 4 is a bottom perspective view of the structure of FIG. 2.
Figure 6:
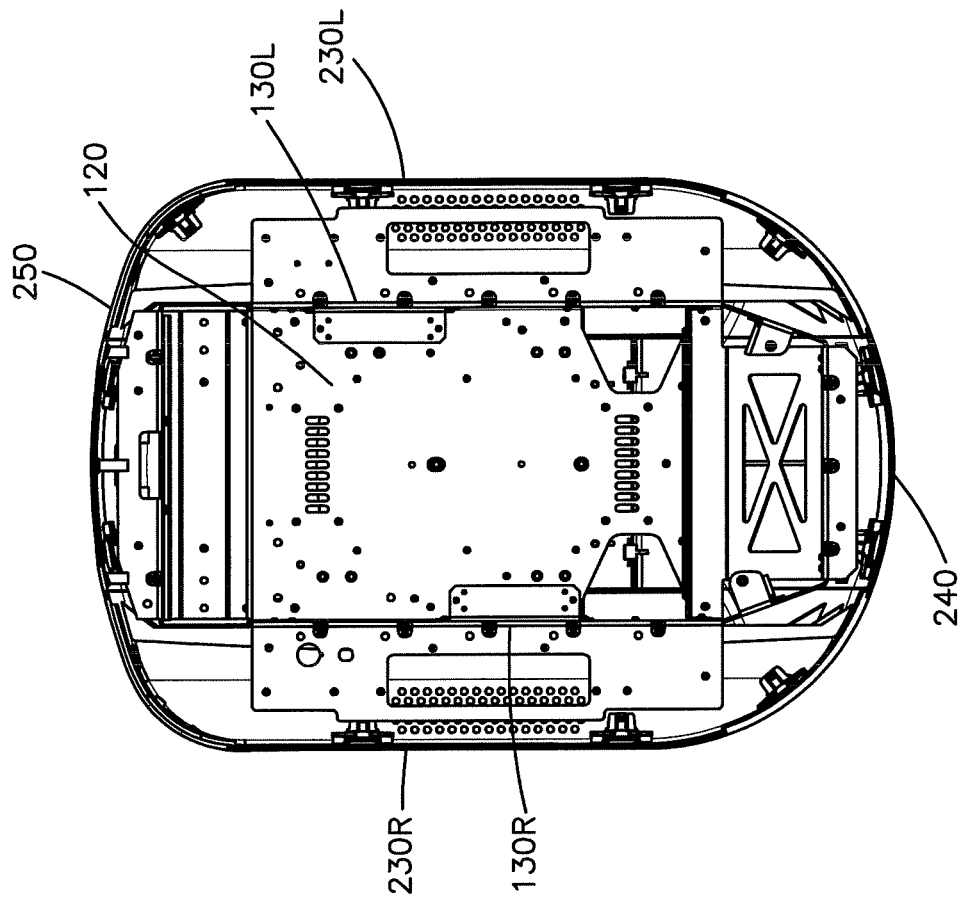
FIG. 6 is a top view of the structure of FIG. 2.
Figure 5:
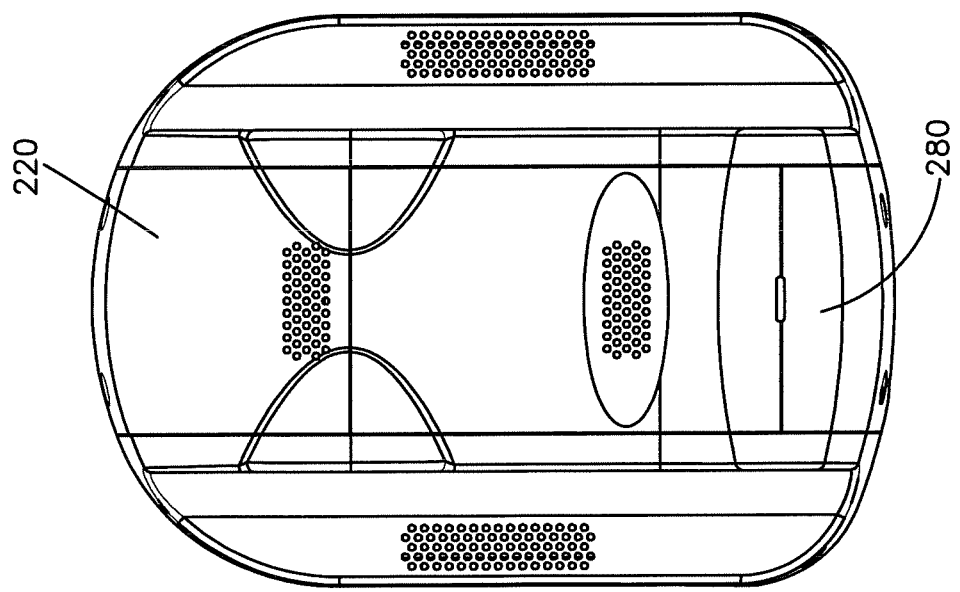
FIG. 5 is bottom view of the structure of FIG. 2.
Figure 8:
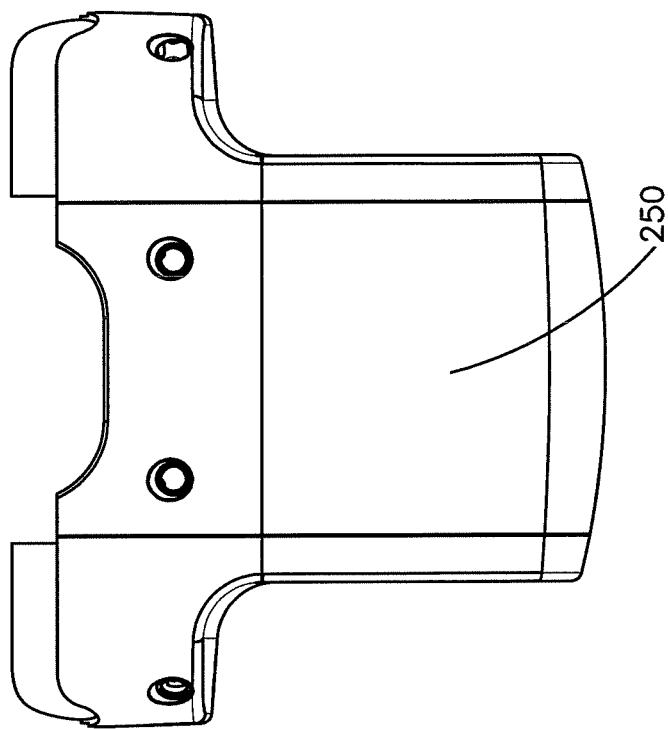
FIG. 8 is a rear view of the structure of FIG. 2.
Figure 7:
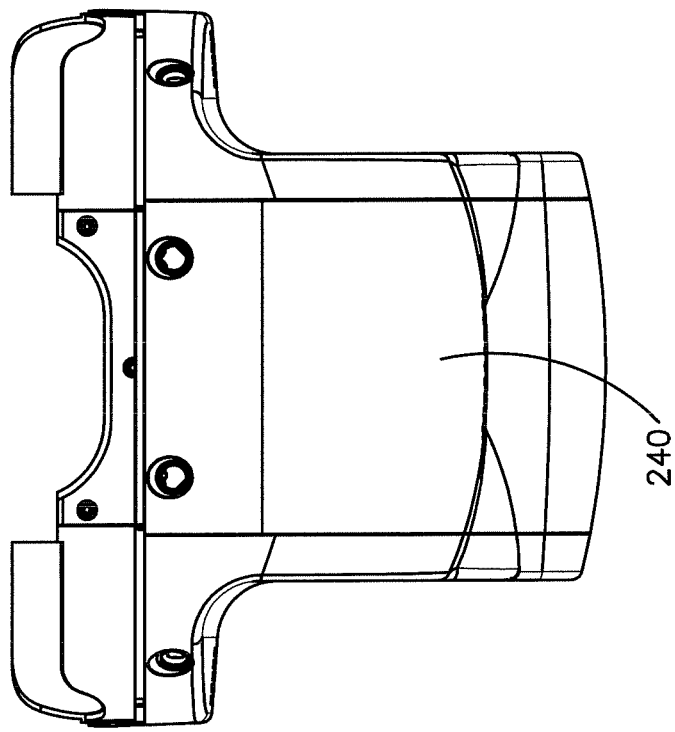
FIG. 7 is a front view of the structure of FIG. 2.
Figure 9:
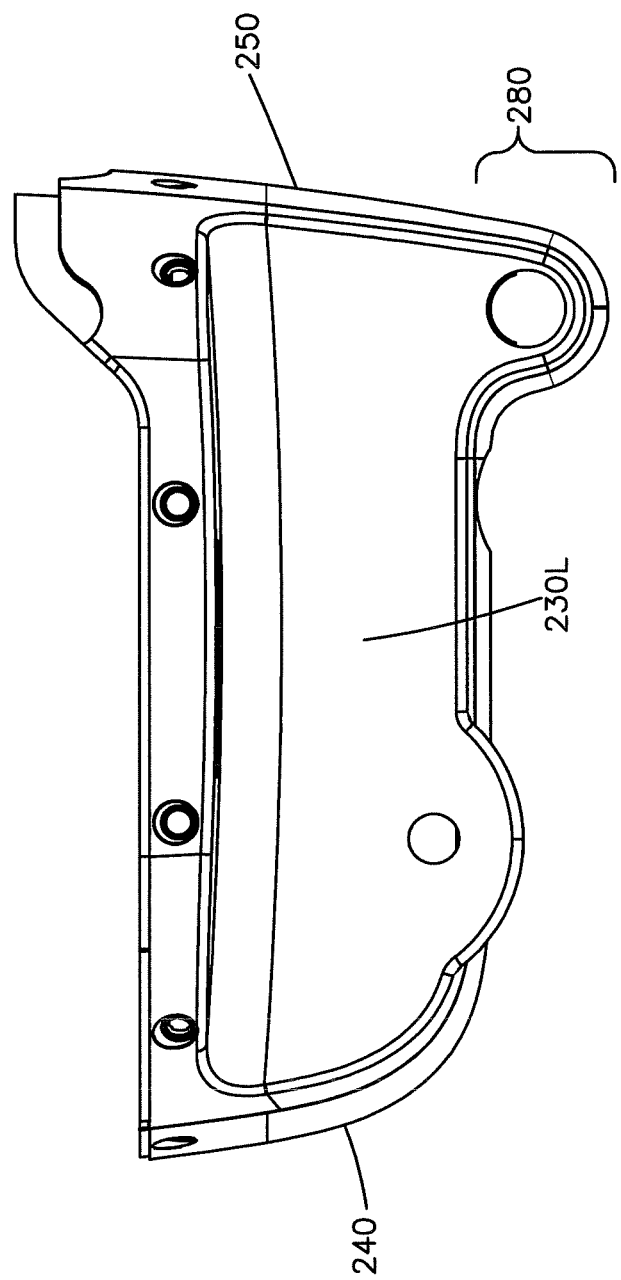
FIG. 9 is a side view of the structure of FIG. 2, with the opposing side being the mirror image of the structure shown in FIG. 9.

An autonomous ground vehicle (AGV) is a category of robot that might operate at times in an unprotected, uncontrolled environment. The term delivery AGV is used for AGVs carrying a payload for delivery purposes. A delivery AGV 10 includes an enclosed cargo compartment, a lower body for carrying the cargo compartment, and a drive system.

According to one aspect of the AGV, the lower body can include an aluminum sheet metal chassis and a skin formed of interlocking, overlapping panels that are applied to and cover an outboard surface of the chassis. Fasteners connecting the skin to the chassis are applied from the inside such that the skin has a fastener-free exterior surface; none of the fasteners are visible on an exterior of the skin.

According to another aspect of the delivery AGV, the lower body includes chassis and an exterior skin. The chassis includes (i) an open top that defines a hardware bay, (ii) front wheel assembly interfaces, and (iii) rear wheel assembly interfaces. Either the front wheel assembly interfaces or the rear wheel assembly interfaces is lower than the other. The exterior skin is connected to the chassis and covers the chassis. The skin includes multiple panels, each of which is connected to a corresponding portion of the chassis by fasteners extending from an inboard face of the chassis into corresponding bosses on the inboard surface of the panel. The panels are at least partially mutually overlapping for water ingress resistance.

The term "panel" is used herein to refer to structures of the skin and is not intended to be limited to any particular structure unless the structure is specified in the claim. For example, the panel may be flat or have a flat portion, but may also be curved, or have curved portions, shoulders, covers, and other features and/or shapes. The fasteners can be any type, such as for non-limiting examples, screws, rivets, interference fit pins that extend into bosses in an interference or tight fit, heat stakes or mechanical stakes that extend from the panels through holes in the chassis and are secured by deformation by heating or mechanical force. Preferably, the fasteners are only visible from inside the lower body such that each one of the panels has a fastener-free exterior surface.

The panels can include a bottom panel, a pair of opposing side panels, a front panel, and a rear panel. The bottom panel can include bottom longitudinal lips on outboard sides thereof, and each one of the side panels includes a side longitudinal lip, the bottom longitudinal lips and the side longitudinal lips overlap one another. As used herein, the terms "fore and aft" refer to relative directions or orientations consistent with the term "longitudinal" and with the driving direction of the delivery AGV.

The side panels can include fore and aft lateral lips, the front panel can include front lateral lips, and the rear panel can include rear lateral lips. The fore lateral lips of the side panels and the front lateral lips overlap. The bottom panel can include fore and aft transverse lips, the front panel can include a front transverse lip, and the rear panel can include a rear transverse lip. The fore transverse lip of the bottom panel and the front transverse lip overlap one another, and the aft transverse lip of the bottom panel and the rear transverse lip overlap one another. As used herein, the term "lateral lip" does not require that the lip be located on a side, as the lateral lips may be on a corner or on the ends. In the figures, the lateral lips are substantially vertical, but verticality is not required.

The bottom panel and the front panel form a hinge structure (hook and tab) adapted for holding a lower edge of the front panel to the bottom panel while pivoting the front panel relative to bottom panel during assembly of the lower body. The bottom panel and the rear panel form a hinge structure adapted for holding a lower edge of the rear panel while pivoting the rear panel relative to the bottom panel during assembly of the lower body.

The side panels and the bottom panel form a clip structure adapted for holding the side panel relative to the bottom panel during assembly of the lower body. Thus, the side panels can be installed by translating them directly toward and into the chassis. The clips can hold the sides in place for alignment and fastening.

The chassis can include an integral, transverse frame that defines a lowermost part of the chassis. In the embodiment of the figures, the transverse frame is at the rear of the chassis, and other locations are contemplated. The transverse frame is integral with the chassis in that it is part of, not moveable relative to, the chassis. The frame is part of the chassis structure.

Front wheel interfaces are formed by recesses in the chassis sides, and the interfaces may be reinforced with a plate, stiffeners, and like structure. The rear wheel interfaces of the chassis are formed on the transverse frame, which in the figures is at the rear of the AGV, but as explained above can be other locations.

In the embodiment of the figures, the chassis is formed of aluminum sheet and/or structural shapes. Other materials and configurations are contemplated.

According to another aspect of the delivery AGV, a method of assembling a lower body for a delivery autonomous ground vehicle (AGV) adapted for carrying and delivering a payload can include the steps of: (a) affixing a bottom panel to a bottom portion of a chassis; (b) after the affixing step (a), hooking a lower edge of a front panel onto a portion of the bottom panel and rotating the front panel about the bottom panel until the front panel contacts the chassis, and then affixing the front panel to the chassis; (c) after the affixing step (a), hooking a lower edge of a rear panel onto a portion of the bottom panel and rotating the rear panel about the bottom panel until the rear panel contacts the chassis, and then affixing the rear panel to the chassis; and (d) after the affixing step (a), affixing opposing side panels to the lower body.

The affixing step (a) can include fastening the bottom panel to the chassis via fasteners through holes in the chassis into bosses formed on an inboard face of the bottom panel; the affixing step (b) can include fastening the front panel to the chassis via fasteners through holes in the chassis into bosses formed on an inboard face of the front panel; and the affixing step (c) can include fastening the rear panel to the chassis via fasteners through holes in the chassis into bosses formed on an inboard face of the rear panel. Each one of the affixing steps (b) and (c) can include overlapping lips of some panels relative to other panels. The fastening steps can include one of inserting screws, inserting rivets, inserting pins, and deforming heat stakes.

Referring to the figures, a delivery AGV 10 includes an upper body 12, a lower assembly or lower body 112, and a driving assembly 14. Upper body 12 includes a shell, a cargo bay, front and rear electronics bays behind corresponding front and rear windows in the housing, and a lid assembly.

Lower body 112 includes a chassis 110 and a skin or shell assembly 210.

Chassis 110 in the embodiment of the figures is formed of sheet aluminum sheets or plates, including a bottom wall 120, left and right side wall 130L and 130R, a front wall 140, and a rear wall 150. The walls are affixed together, such as by rivets or other conventional means, to form a structure that is unitary and capable of supporting AGV 10. Chassis 110 has an open top and forms a hardware bay for holding batteries, power component (such as motor controllers, PCBs and the like) and other components as needed. Forward and rearward bays can house sensors and like components.

A rear portion of bottom wall 120 and a bottom portion or rear wall 150 merge into a transverse structure 180, which forms a lowermost portion of chassis 110 and provides structural support for the rear wheel assemblies. Chassis 110 also includes flanges 142 to support portions of the upper assembly 12. The walls also include holes 170 for receiving screws. Openings for alignment features may also be provided.

Figure 10:
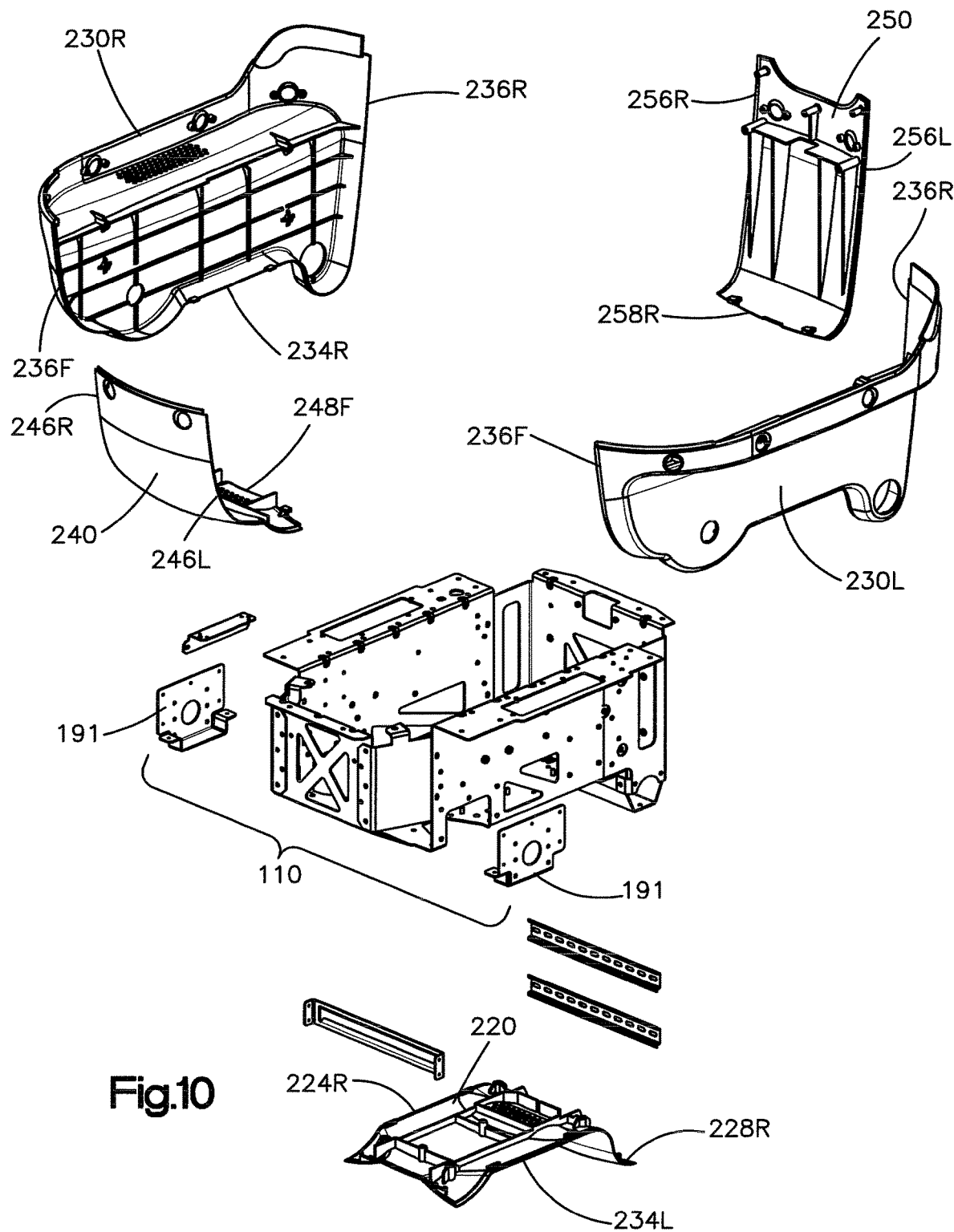
FIG. 10 is an exploded view of the structure of FIG. 2.
Figure 12:
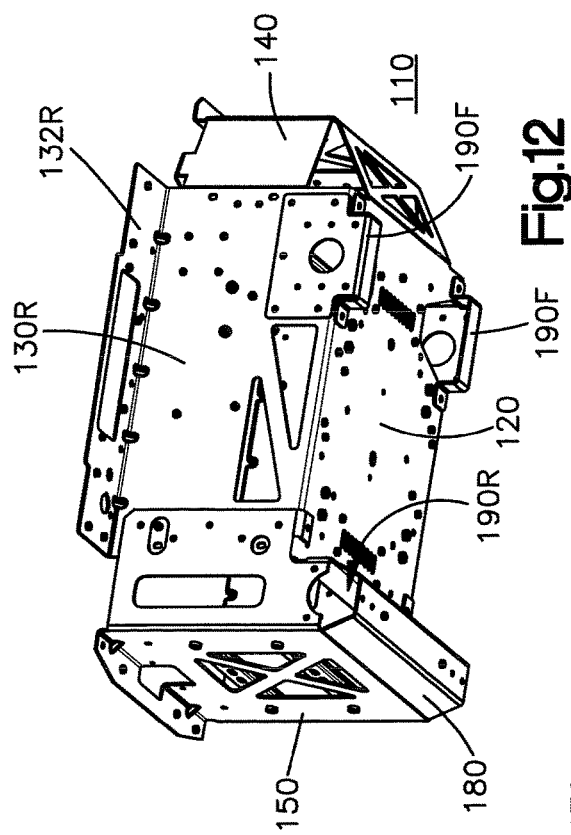
FIG. 12 is a bottom, rear perspective view of the chassis of FIG. 11.
Figure 13:
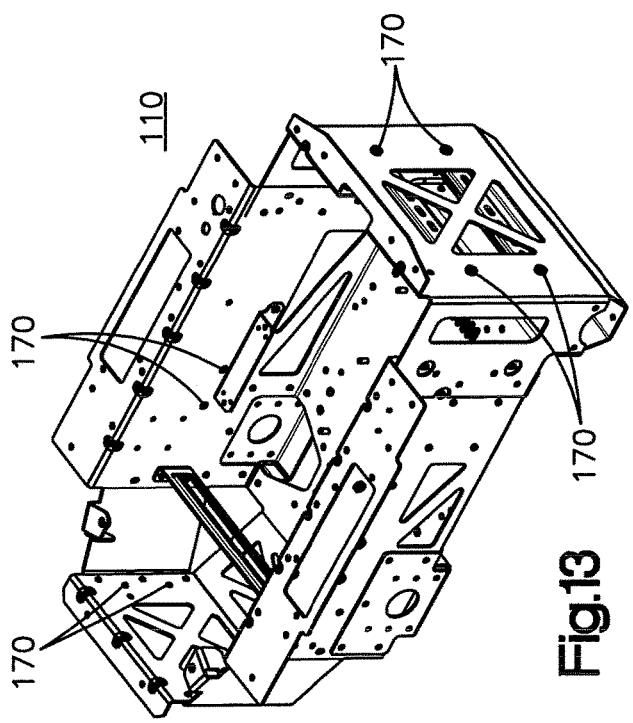
FIG. 13 is a top, rear perspective view of the chassis of FIG. 11.
Figure 11:
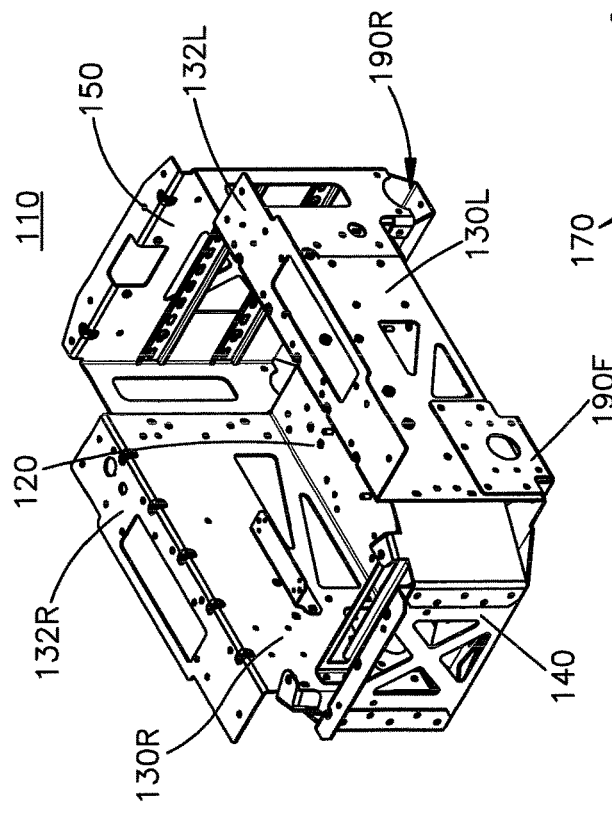
FIG. 11 is a top, front perspective view of the chassis component of the structure of FIG. 2.
Figure 14:
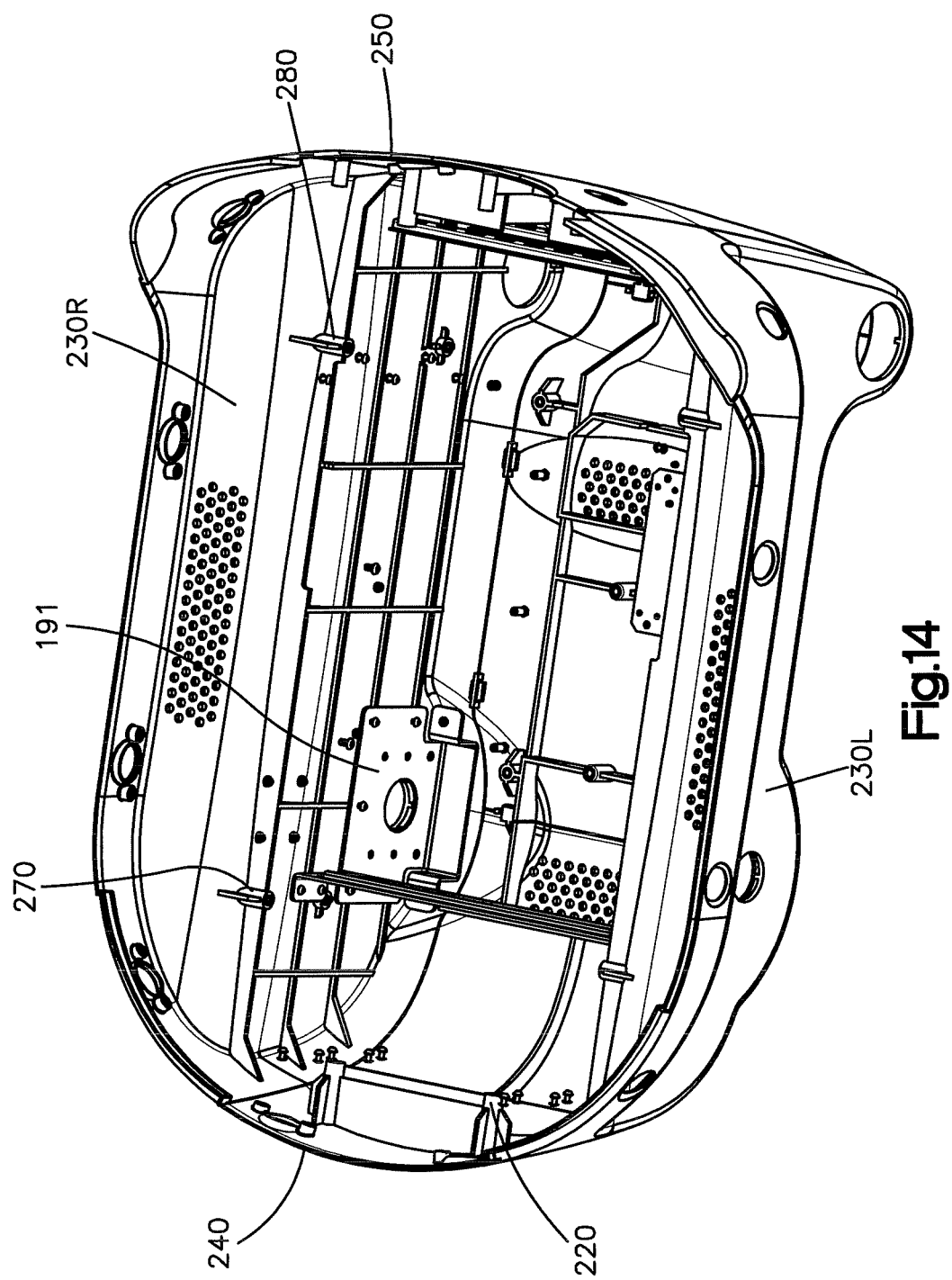
FIG. 14 is a top perspective view of the assembled panels of FIG. 2, with the chassis removed for clarity.
Figure 15:
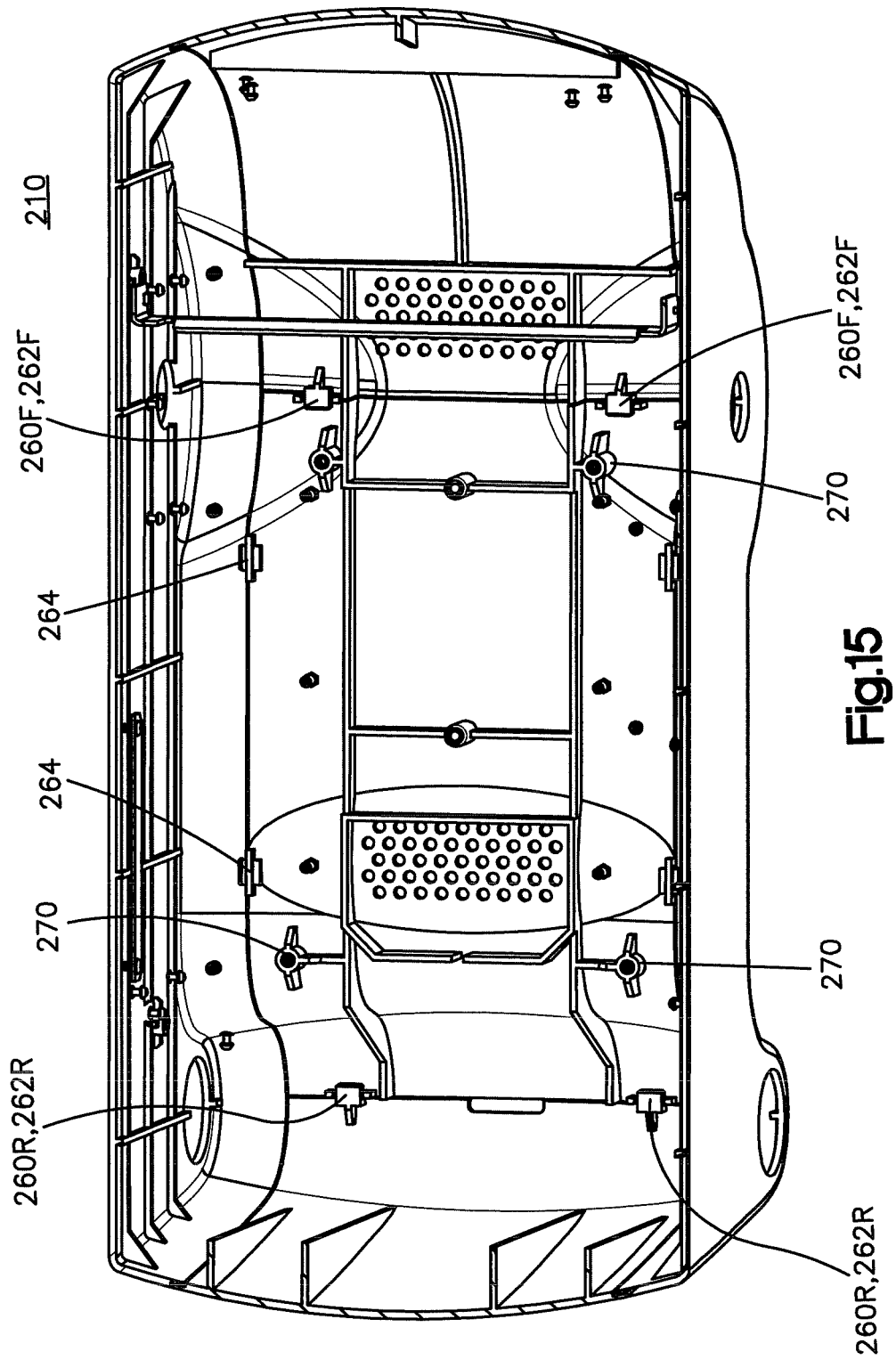
FIG. 15 is another top perspective view of the assembly of FIG. 14 with additional portions removed for clarity.
Figure 16:
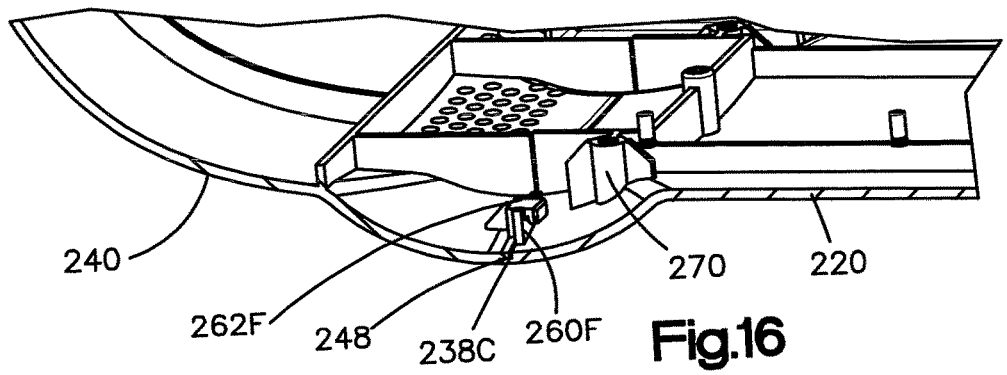
FIG. 16 is an enlarged, cross section portion of the skin of assembly of FIG. 14, illustrating aspects of the bottom and front panels.
Figure 17:
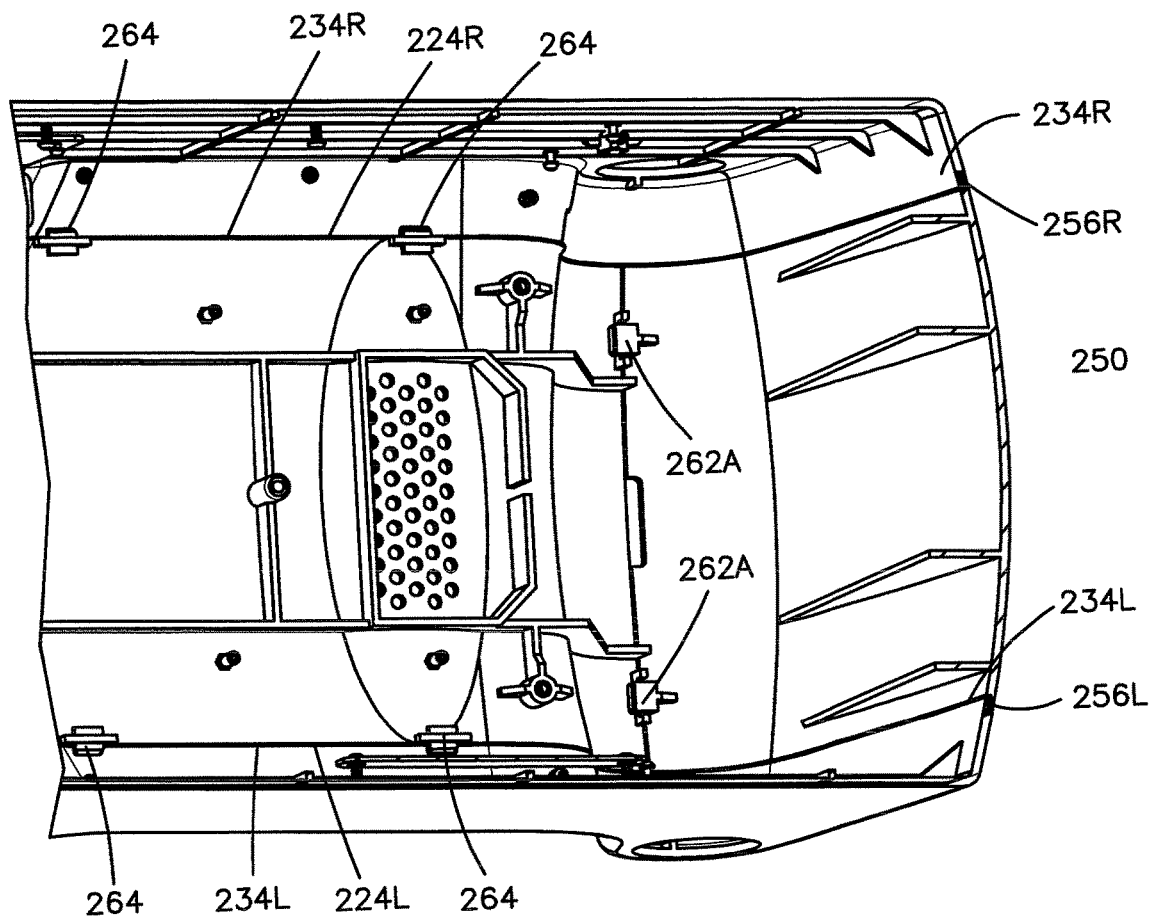
FIG. 17 is an enlarged view of the assembly of FIG. 14 illustrating aspects of the rear, side, and bottom panels (including the barrel form by the bottom panel and the rear panel)
Figure 18:
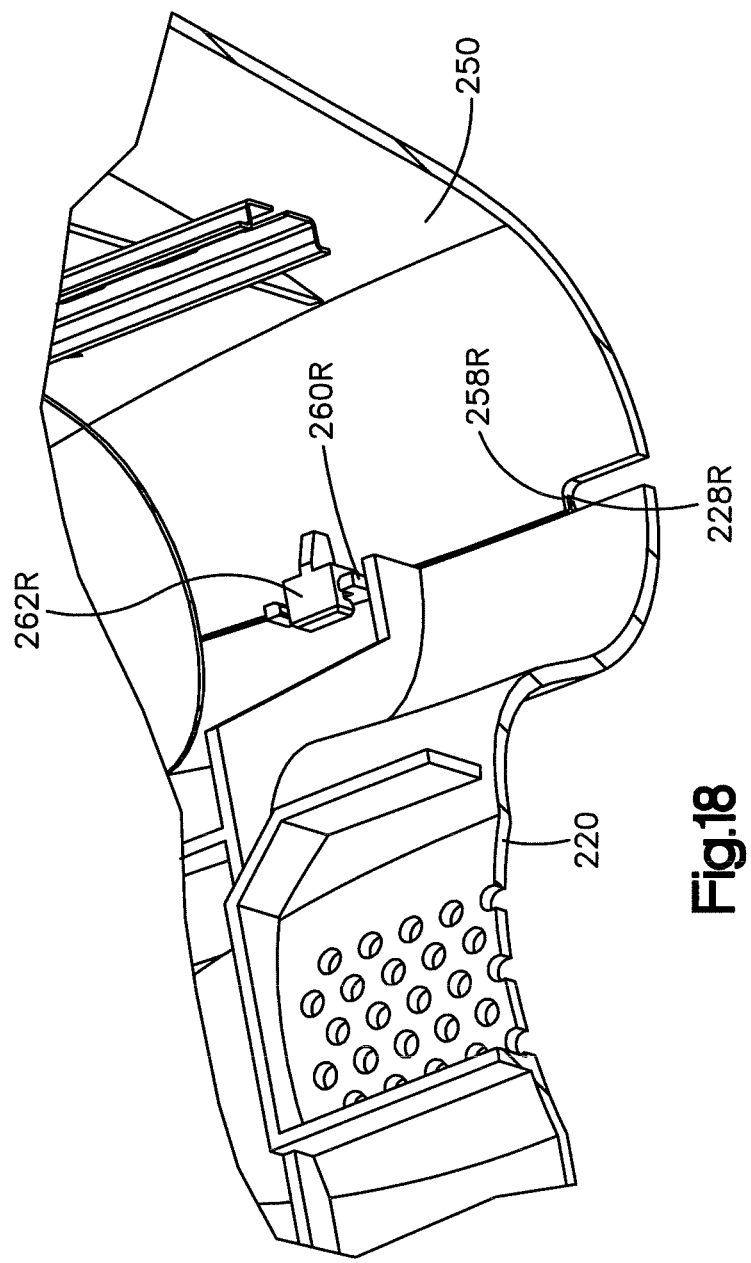
FIG. 18 is an enlarged view of a portion of the structure shown in FIG. 17, including the interface between the bottom panel and rear panel.
Figure 19:
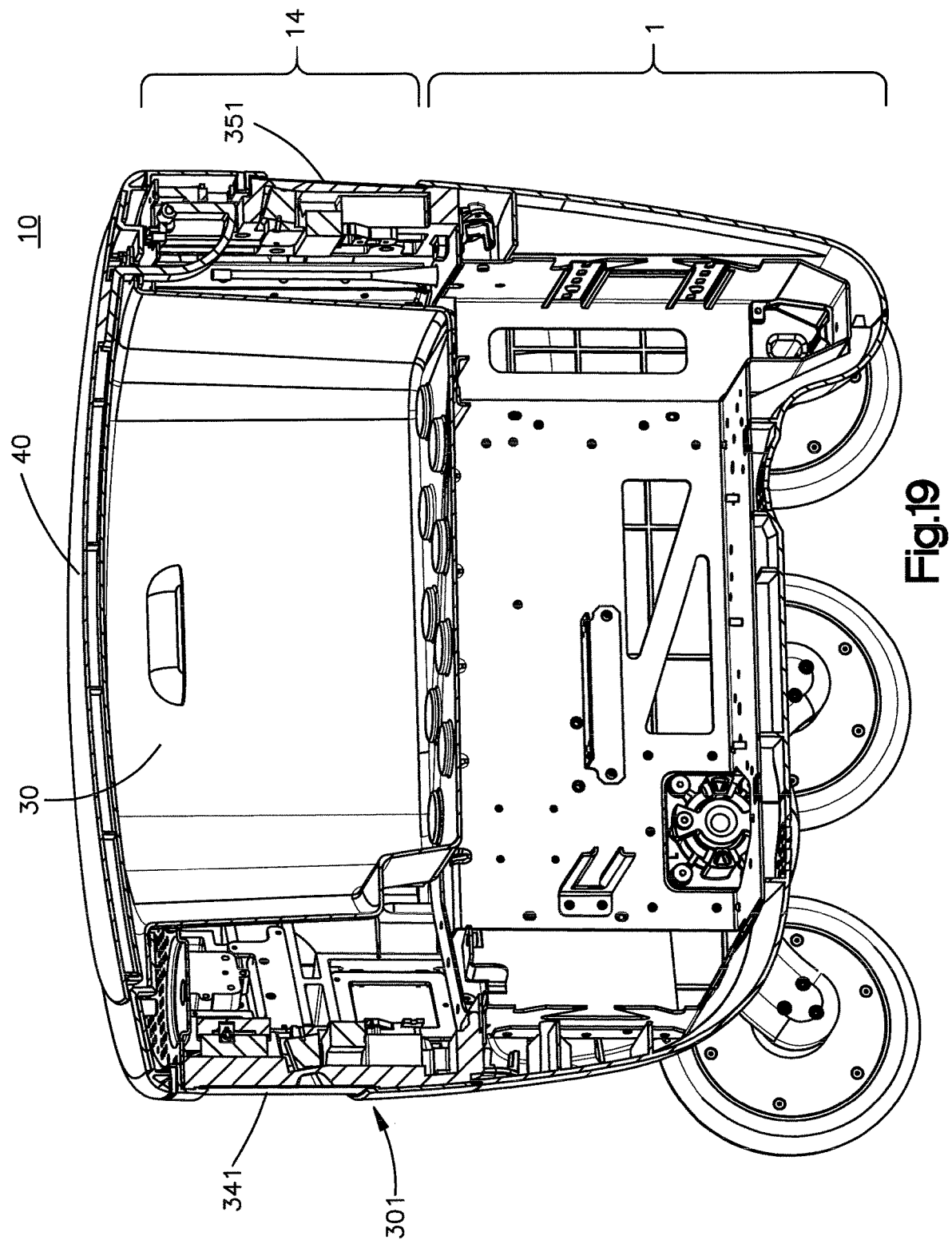
FIG. 19 is a longitudinal cross section of the delivery AGV of FIG. 1.
Figure 20:
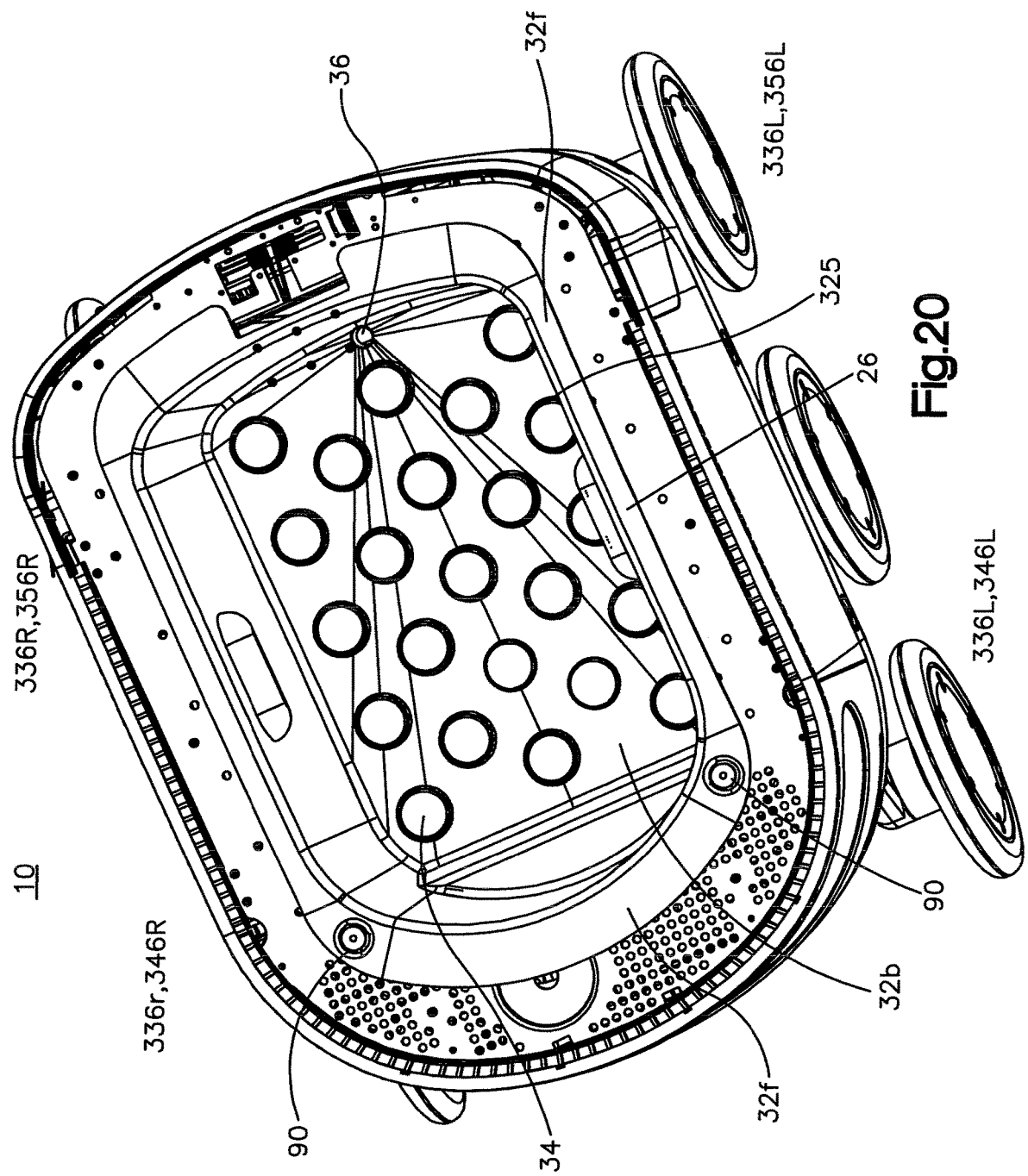
FIG. 20 is top perspective view of the AGV of FIG. 19 with the lid removed.
Figure 24:
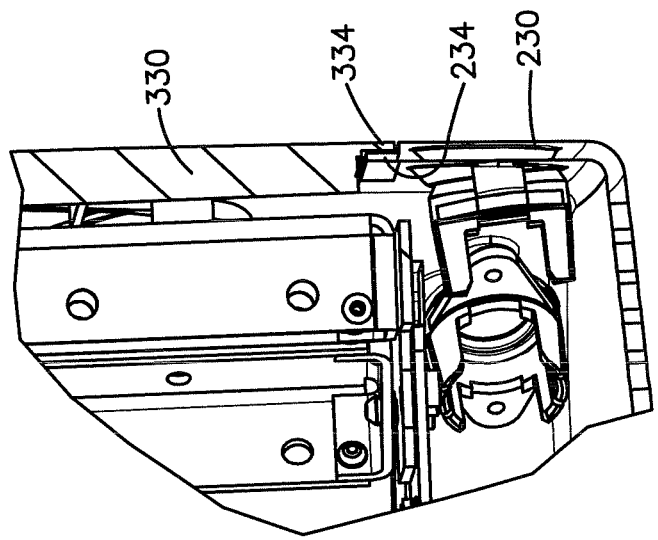
FIG. 24 is an enlarged cross sectional view of a side portion of the AGV of FIG. 19 illustrating panel overlap.
Figure 23:
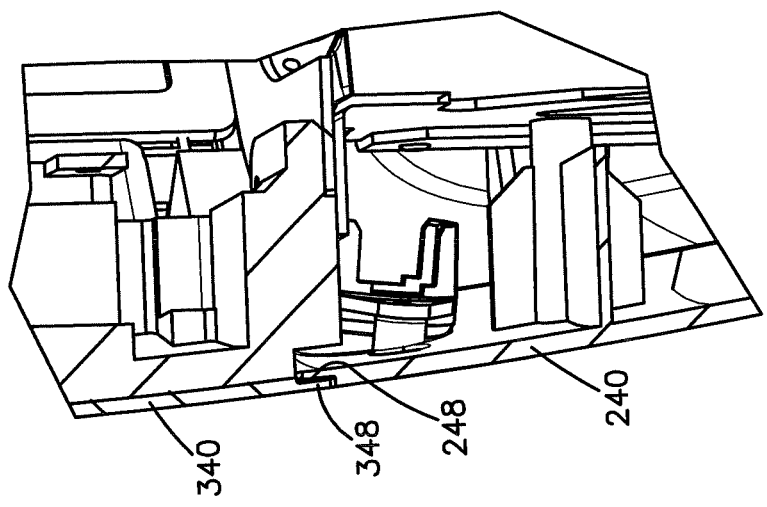
FIG. 23 is an enlarged cross sectional view of a front portion of the AGV of FIG. 19 illustrating panel overlap.
Figure 22:
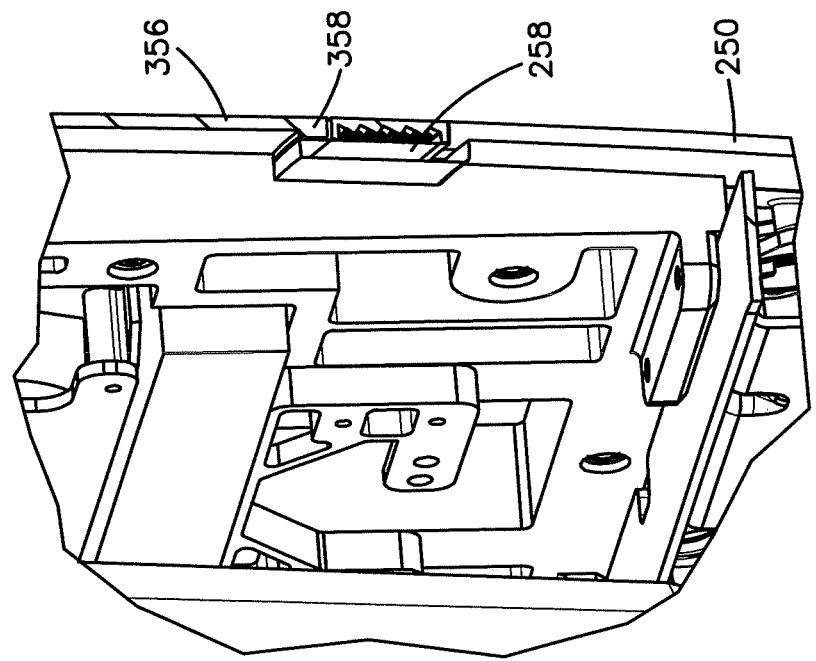
FIG. 22 is an enlarged cross sectional view of a rear portion of the AGV of FIG. 19 illustrating panel overlap.
Figure 26:
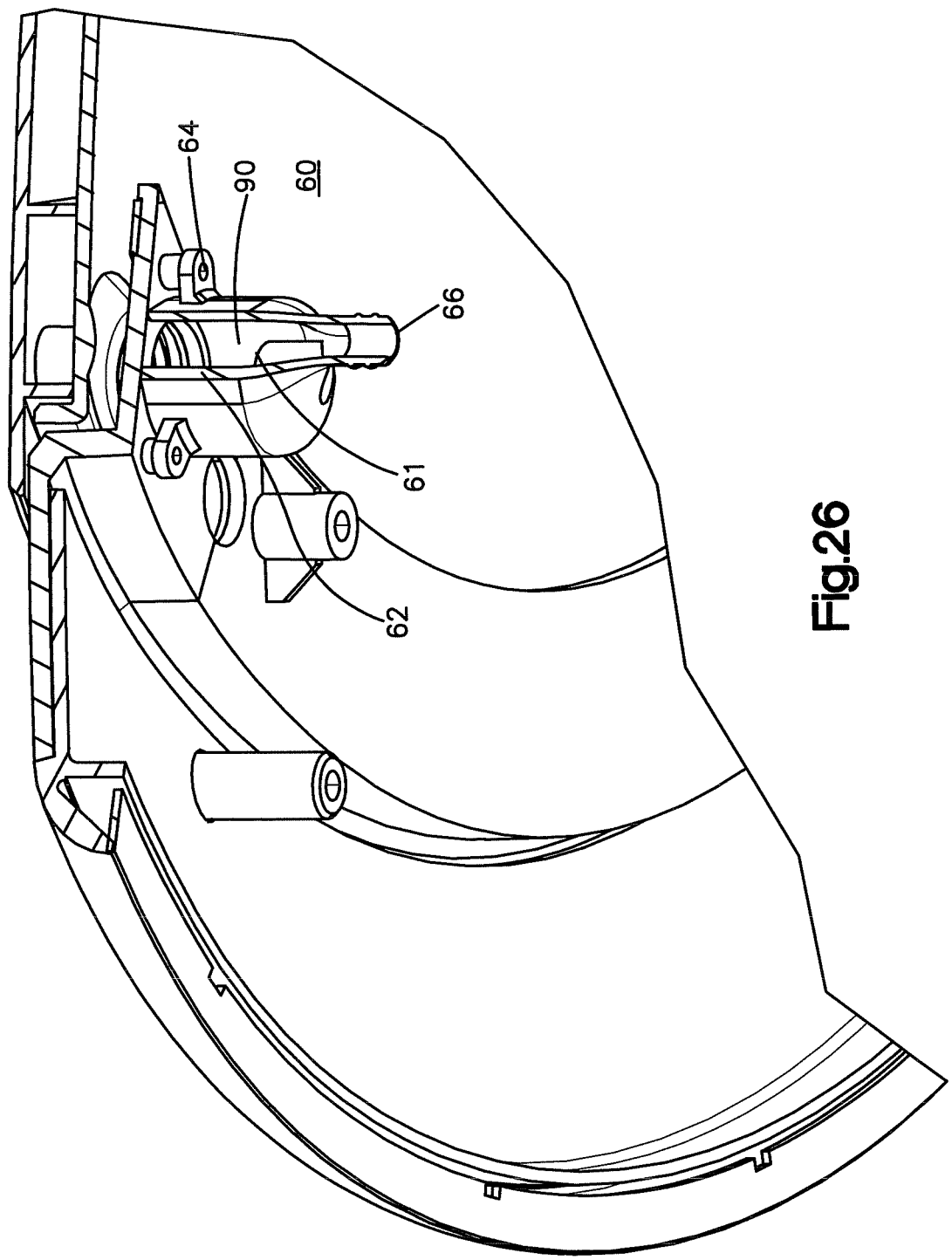
FIG. 26 is a perspective cross sectional view of the hold-down device of FIG. 25.
Figure 28:
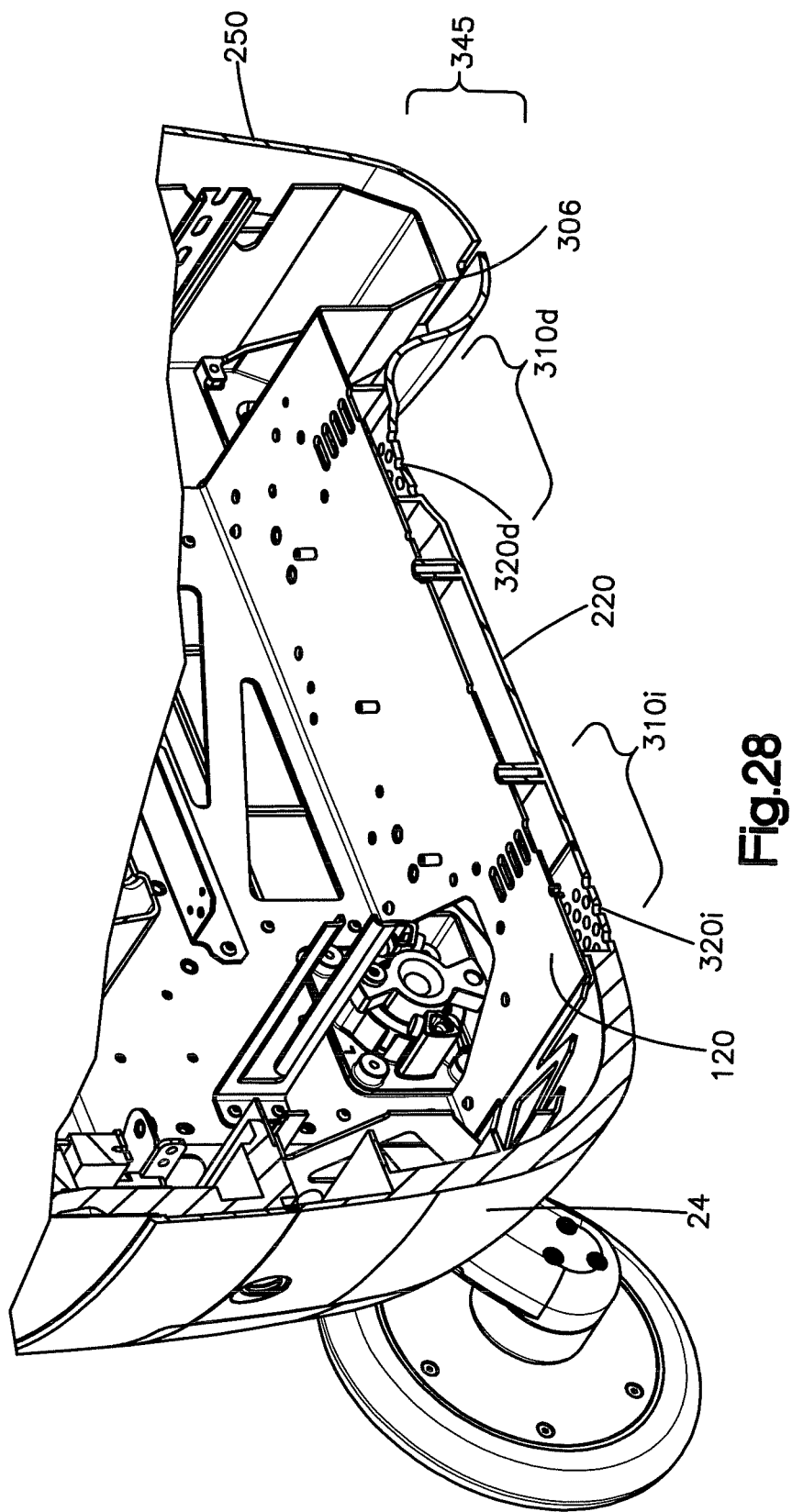
FIG. 28 is a perspective, cross sectional view of a lower portion of the AGV illustrating air inlets and outlets.
Figure 29:
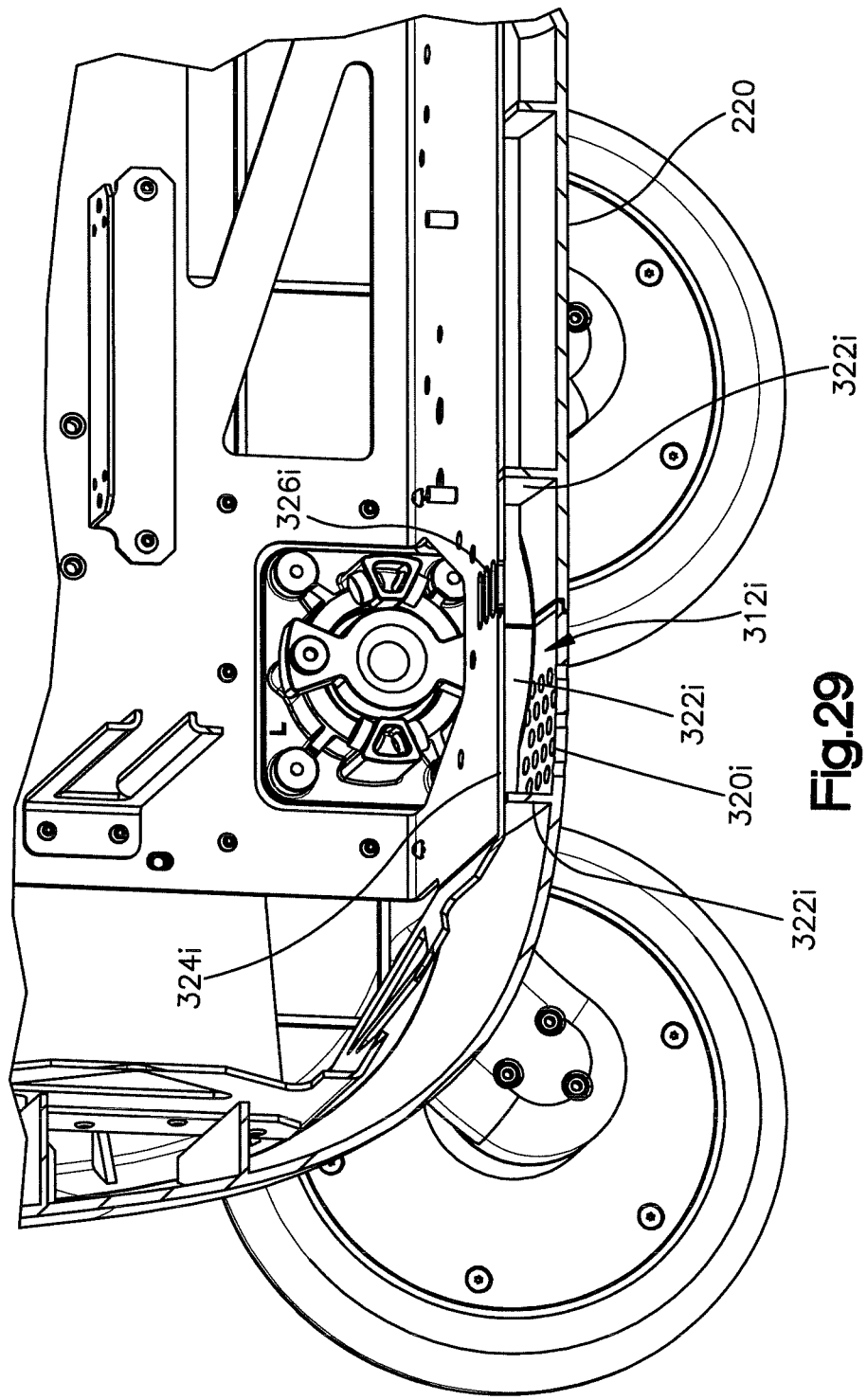
FIG. 29 is an enlarged view of a rear, inlet air portion of the structure of FIG. 28.
Figure 30:
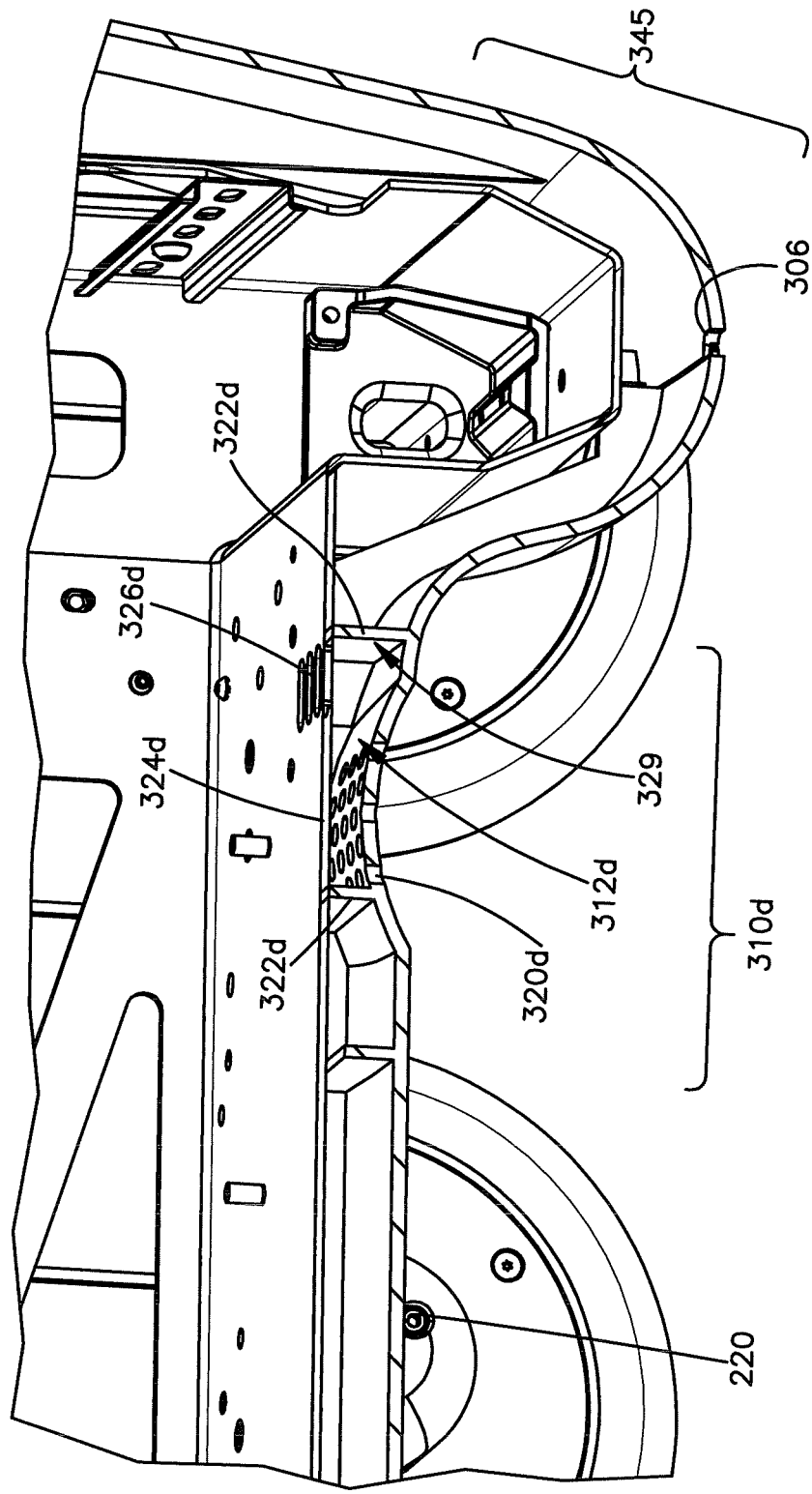
FIG. 30 is an enlarged view of a front, outlet air portion of the structure of FIG. 28.
Figure 31:
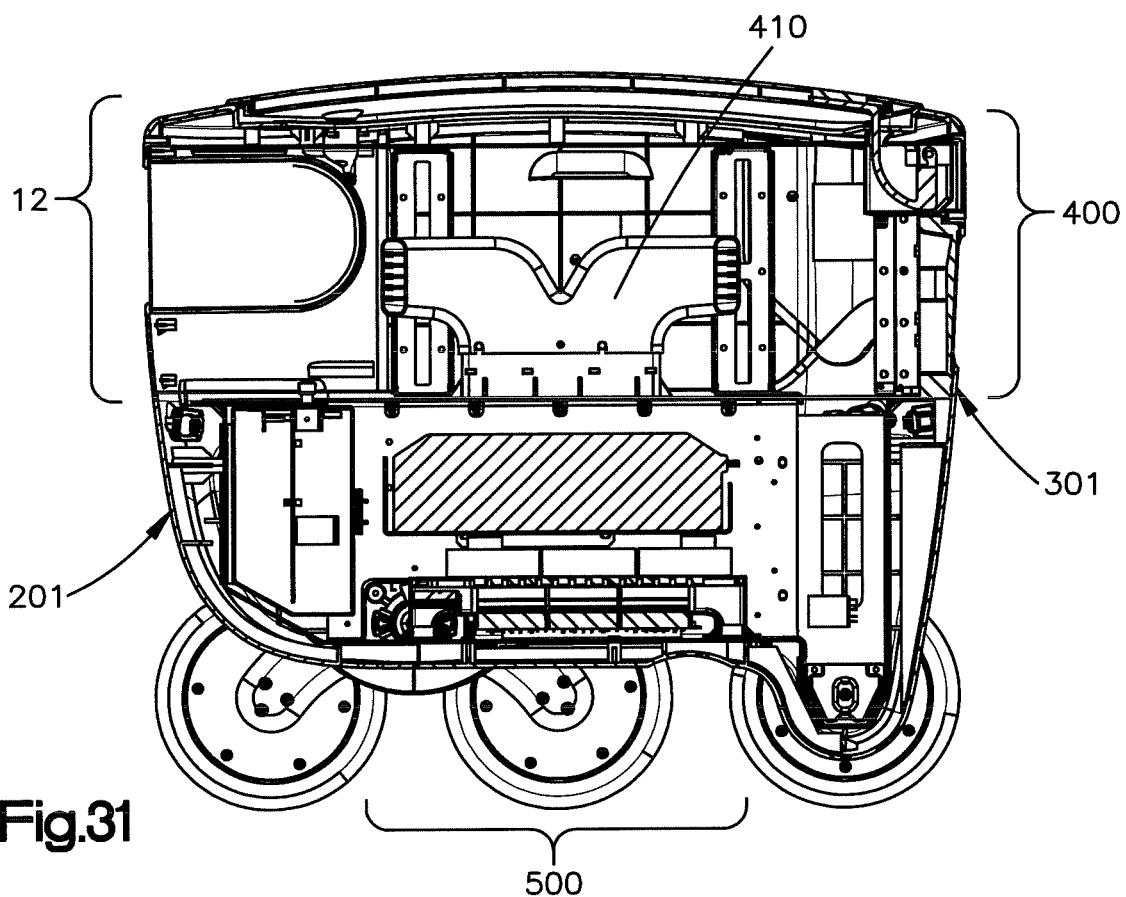
FIG. 31 is a longitudinal cross sectional view of an AGV, illustrating upper and lower thermal management systems.
Figure 32:
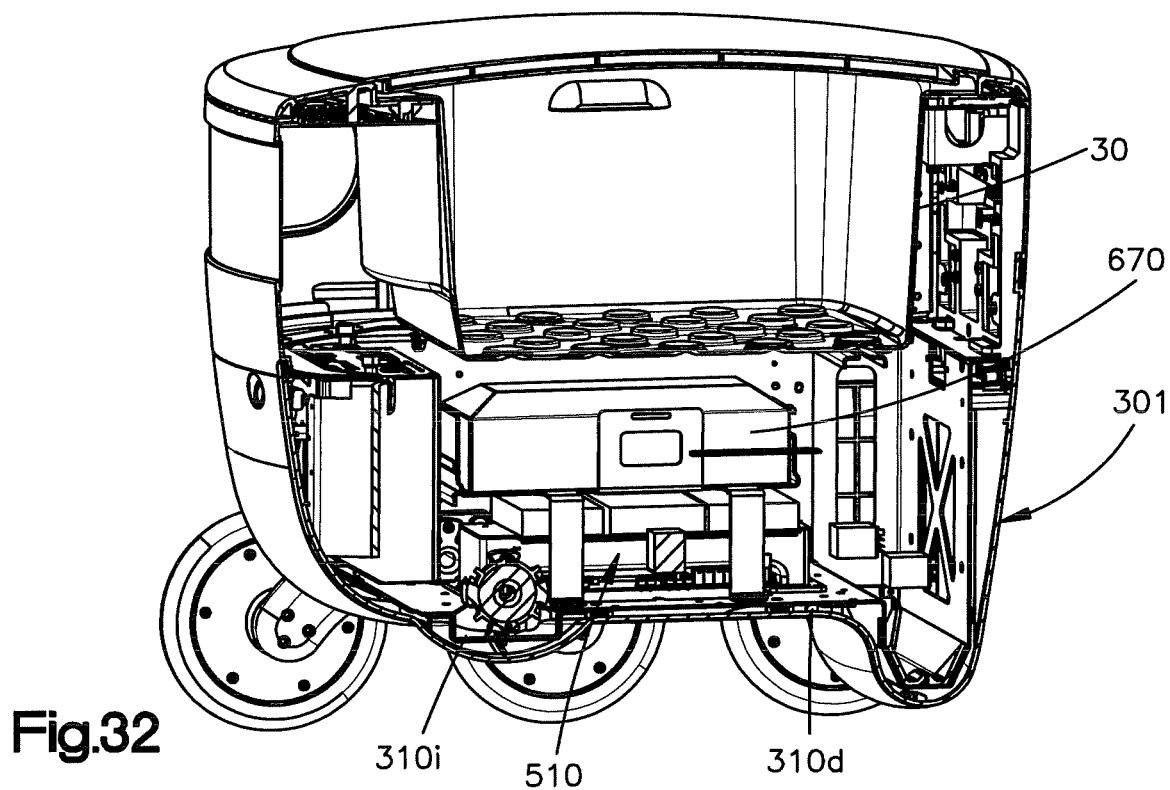
FIG. 32 is a perspective view of the AGV of FIG. 31, enlarged to illustrate the lower body thermal management system.
Figure 33:
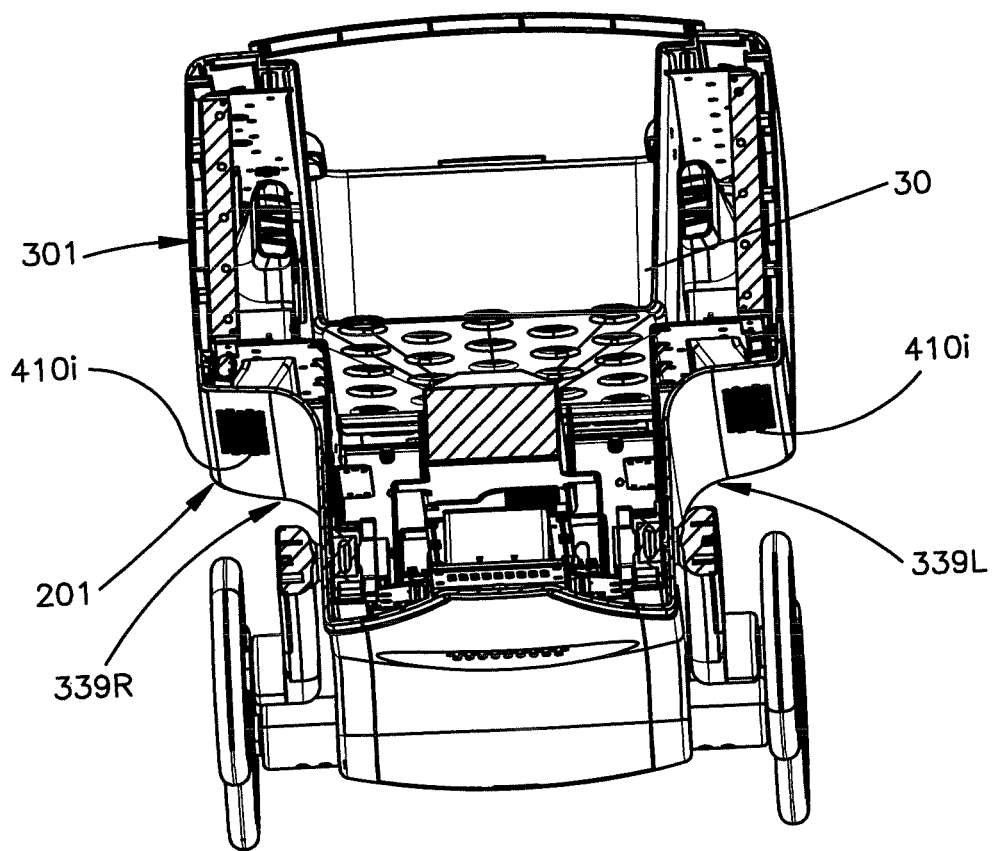
FIG. 33 is another perspective cross sectional view taken laterally through the AGV, facing rearward.
Figure 34:
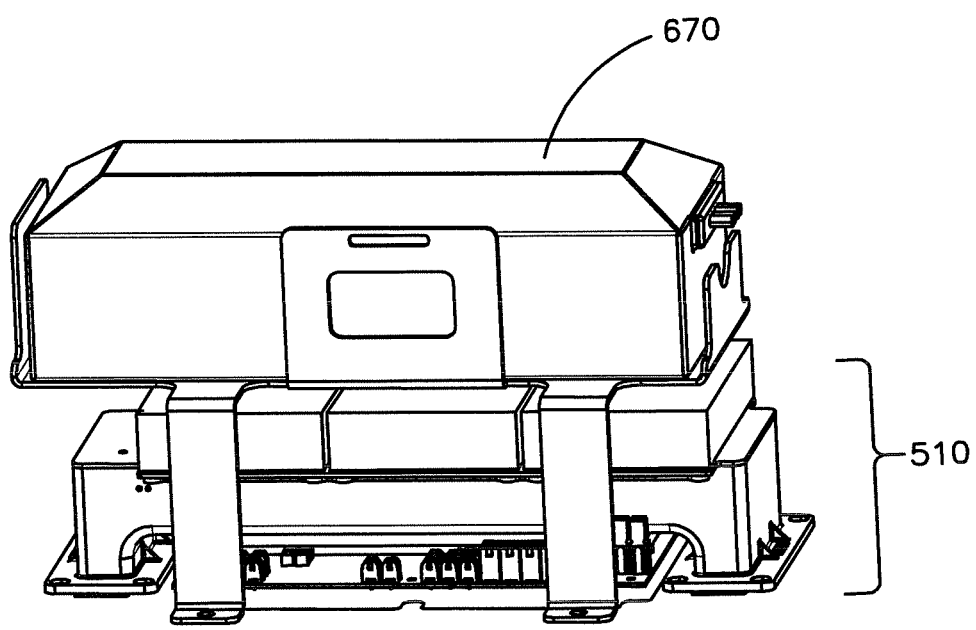
FIG. 34 is an enlarged portion of the AGV, illustrating the batteries and components of the lower body thermal management system.
Figure 35:
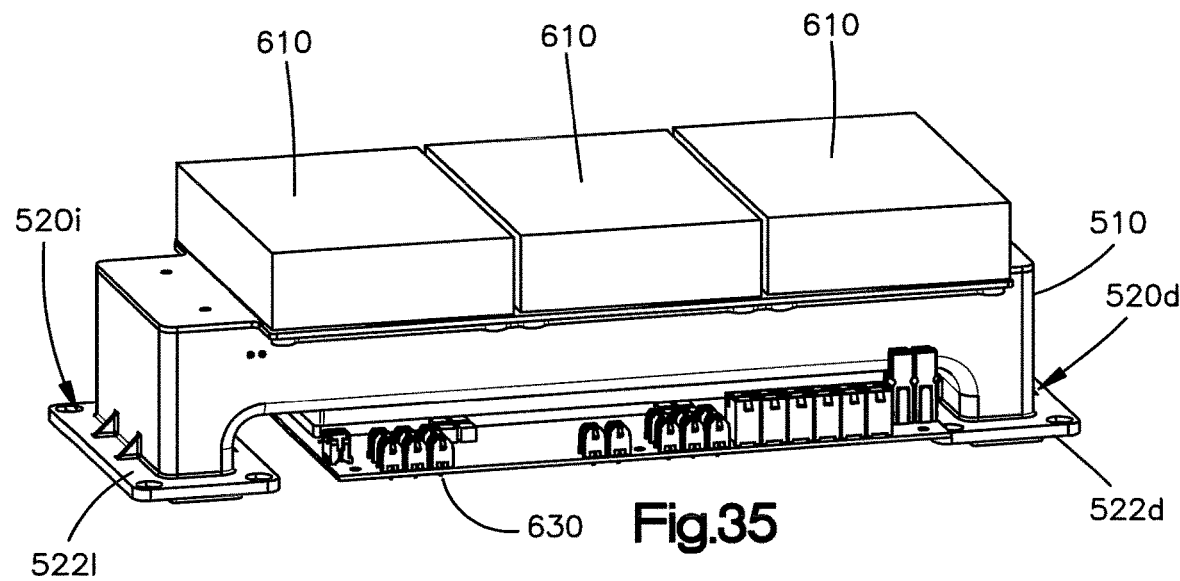
FIG. 35 is another enlarged view illustrating components of the thermal management system and heat-generating components.
Figure 36:
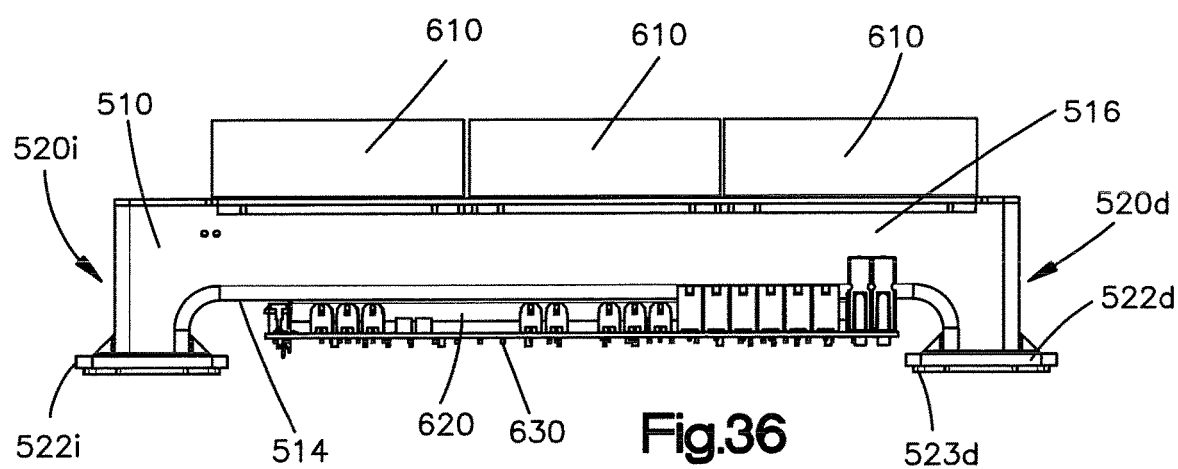
FIG. 36 is a side view of the components of FIG. 35.

Transverse frame 180 includes structure features forming rear wheel assembly interfaces. A forward portion of chassis 110 includes holes or cutouts housing front wheel assemblies. For example, plates 191 that are part of the motor and wheel assembly are illustrated in FIG. 10. FIGS. 11-13 omit plates 191. Other configurations are contemplated. Frame 180 includes ends 190 that receive drive wheel motors or structures to secure drive motors to the chassis.

The walls of the chassis include structural and functional features that depend on the particular application, including a tapered nose (that is, front walls 140 tapers when viewed in top view), various openings, tabs, structural cross-members, and the like. The walls of chassis 110 can be formed of any material suitable for supporting the panels and wheel assemblies as the AGV carries the intended load. Aluminum sheet metal is used in the embodiment of the figures. The thickness, specific material, use of stiffeners and other structural supports, and other decisions relating to the material choice and properties can be made according to the particular goals of the AGV, including strength, weight, and like parameters.

Shell 210 includes a bottom panel 220, left and right side panels 230L and 230R, a front panel 240, and a rear panel 250. Shell 210 encloses chassis 110. Panels 220, 230, 240, and 250 encase chassis 110, and are included with relatively flat portions, curved shoulders, and like features for aesthetic and functional purposes. Side, front, and rear panels 220, 230, and 240 are upright, while bottom panel 220 forms the underside of shell 210.

A rear portion of bottom panel 220 curves downwardly about a forward portion of chassis transverse frame 160. A lower portion of rear panel 250 curves inwardly about a rear portion of chassis transverse frame 180. The rear portion of bottom panel and the lower and forward portion of rear panel 250 form a barrel 280 having a drain 306.

The panels include several features chosen according to the particular parameters of the application, such as openings for ultrasonic sensors, drain holes and air inlets, shoulders and undercuts, provisions for receiving windows for sensor bays, among others. The panels are formed of an appropriate engineering polymer, such as polycarbonate or a polycarbonate and ABS blend, suitable for its intended duty, as will be understood by persons familiar with outdoor use of polymers in low speed vehicles in view of the present disclosure. The overall weight of the components is a factor in the choice of materials.

The panels can have shapes that vary from the shapes and configurations shown depending on the application parameters. The panels preferably include overlapping lips to prevent ingress of water, such as by splashing or driving rain. In addition, seals or gaskets may be provided. The panels are affixed to the chassis via screws through holes 170 in the chassis that mate with bosses 270 extending inwardly from inboard faces of the panels, as illustrated in the figures. Other configurations are contemplated.

In this regard, bottom panel 220 includes bottom longitudinal lips 224L and 224R at left and right longitudinal edges, and includes fore and aft transverse lips 228F and 228R. Each side panel 230L and 230R includes longitudinal lips 234L and 234R that mate with or overlap with corresponding bottom longitudinal lips 224L and 224R of bottom panel 220. Each side panel also includes fore and aft lateral lips 236F and 236R.

Front panel 240 includes a front transverse lip 248 that mates with or overlaps with the front transverse lip 228F of bottom panel 220. Front panel also includes left and right lateral lips 246L and 246R that overlap with or mate with corresponding side transverse lips 236L and 236R.

Rear panel 250 includes a rear transverse lip 258 that mates with or overlaps with the rear transverse lip 228R of bottom panel 220. Rear panel 250 also includes left and right lateral lips 256L and 256R that overlap with or mate with corresponding side transverse lips 236L and 236R.

Features for holding the panels in place, either temporarily during installation, include clips and hooks, as explain with a method of assembling the panels to the chassis. A complete, structural chassis 110 is first fitted with bottom panel 220 by fastening the two parts together.

Next, hooks 262F that extend downwardly from a lower edge of front panel 240 (preferably two hooks) are inserted over corresponding tabs 260F at or near a front edge of bottom panel 220. Hooks 262 and tabs 260 are on the inboard faces of the panels. As illustrated in the figures, tabs 260 can be open on top to ease receiving the corresponding hooks. Other configuration of hooks and tabs form a hinge are contemplated.

After engaging the hooks with the tabs, the front panel 240 is pivoted relative to bottom panel 220 until it contacts the face of front plate 140 of the chassis. Front panel 240 is affixed to plate 140 by any means, such as fasteners described herein.

Hooks 262R that extend downwardly from a lower edge of rear panel 250 (preferably two hooks) are inserted over corresponding tabs 260R at or near a rear edge of bottom panel 220. After engaging the hooks with the tabs, the rear panel 250 is pivoted relative to bottom panel 220 until it contacts the face of chassis rear wall 150 of the chassis. Rear panel 250 is affixed to chassis rear wall 150 by any means, such as fasteners described herein.

Then the two opposing side panels 230L and 230R can be translated inwardly, with the lips of the panels overlapping the lips of the bottom panel 220 and front and rear panels 240 and 250. Other overlapping configurations are contemplated.

AGV 10 can also include features that form a drainage system. In this regard, water can enter the interior of AGV 10 when the lid of the robot is open. In some circumstances, water can also infiltrate around the lid, be splashed or driven by wind between the panels, and/or be splashed or driven by wind into a cooling air inlet or discharge. The water ingress can harm the package to be delivered and/or damage electronic components. In this regard, the term "drainage" refers broadly to removing water from the interior of the AGV. Features for inhibiting water ingress into the interior of the AGV are also provided.

The AGV includes a lower body and an upper body. The lower body includes a chassis, overlapping exterior panels attached to the chassis, a cooling air path, and a drain outlet at a low point. The upper body includes a cargo bay that has an open top, a sloped bottom panel that includes raised dimples and a cargo bay drain outlet at a low point of the bottom panel.

The cooling air path can:
(i) be formed by ribs on a bottom panel and portions of the chassis,
(ii) communicate cooling air with heat-generating components of the AGV,
(iii) include an air intake path including an air inlet bend; and
(iv) includes an air discharge path including an outlet bend.

The bends inhibit water ingress above the bend to shield components within the AGV body from water contact.

According to another aspect of the drainage system and water ingress system of a delivery AGV, the lower body includes a chassis, overlapping exterior panels attached to the chassis, and a main drain outlet at a low point thereof. The upper body includes a cargo bay that has an open top, a sloped bottom wall that includes raised dimples, and a cargo bay drain outlet at a low point of the bottom panel. The dimples can take any form such that projections above a bottom surface to elevate a package or like item above the bottom surface. The cargo bay drain outlet drains to the main drain outlet. The lid can have a closed position in which the lid covers the cargo bay and an open position in which the cargo bay is accessible.

A hold-down assembly can have a body and a mount. The hold-down assembly can be located at an opening in the cargo bay flange such that the hold down assembly body is adapted for releasably securing the lid in the closed position. The mount can:
(i) connect the hold down assembly body to the cargo bay flange;
(ii) enclose an underside of the opening; and
(iii) include a drain outlet,
whereby water entering the cargo bay flange opening about the hold-down assembly body is captured by the mount and guided to the hold-down assembly drain outlet. In this regard, the term "connecting" broadly refers to both direct contact and coupling with an intermediate article between the connected articles.

The hold down assembly can be magnetic or other types, such as a releasable latch (not shown in the figures), which can be of any conventional structure and function. The hold down assembly drain outlet is connected to the AGV main drain outlet.

The delivery AGV can optionally include a seal between the underside of a periphery of the lid and a peripheral flange of the cargo bay. The AGV can also include an actuated hinge for lifting the lid relative to the cargo bay, and a hinge drain pan located below the hinge and adapted to catch water infiltrating around the hinge components. The hinge drain pan can have a drain pan outlet that is connected to the AGV main drain outlet. Further, the lid includes a peripheral lip that extends over an edge of the body that is sloped away from the cargo bay in order to shed water.

According to another aspect of the delivery AGV drain system, drainage features include aspects of an air intake system, either in combination with the features listed above or by itself An air intake opening (for example, holes) is formed in a bottom one of the panels and receives ambient cooling air. Preferably, the air intake is proximate the front of the AGV and is bottom facing. The lower body also includes air intake walls that, together with an underside of the bottom wall of the chassis, form the inlet air path. The air intake path includes an upward bend having an outlet that is offset from the air intake, thereby inhibiting water ingress above the bend to shield components within the chassis from water contact. The phrase "offset" generally refers to not being aligned, and also encompasses a baffle (not shown in the figures) between the inlet and outlet to perform the same function. The air intake walls can be formed by ribs of a bottom one of the panels and by a portion of the chassis. The chassis can have an opening at the bend.

Further, the delivery AGV can have an air outlet opening (for example, a matrix or array of through-holes) formed in the bottom panel and adapted for discharging cooling air after contact with heat-generating components of the delivery AGV. The lower body includes outlet air path walls forming an outlet air path that includes a bend, which is offset from the air outlet opening to inhibit water ingress above the bend, in this way shielding components within the AGV body from water contact. The air outlet path is in the rear of the lower body, or otherwise near the main drain.

In this regard, components of the AGV, such as motor controllers and other electronic components, give off heat during operation and benefit from cooling air. The outlet air path walls that handle the cooling air may be formed by ribs of the bottom panel and an underside of the bottom wall of the chassis. The bottom panel forms a portion of a floor of the outlet air path that is sloped toward the main drain. The chassis has an opening at the outlet air path bend. Water not exiting via the main drain can exit via the air intake holes or the air discharge holes.

Referring to FIG. 1 and FIGS. 19-30, AGV 10 includes an upper body 12 that is carried by a lower body 110. Upper body 12 (in the embodiment of the figures) includes a skin or shell 301, a cargo bay 30, and lid 40. Upper body 12 also includes forward and rear looking sensors and other components, which are not shown in FIGS. 19-30 for clarity, behind front and rear windows 341 and 351.

Shell 301 defines a portion of the exterior of the AGV, and includes a pair of opposing, overlapping side panels 330L and 330R, a front panel 340, and a rear panel 350. Together panels 330, 340, and 350 wrap the AGV, and may be formed of an appropriate engineered polymer, such as a polycarbonate or polycarbonate ABS blend, as will be understood by persons familiar with outdoor, low speed vehicles. Preferably, panels 330, 340, and 350 are fastened to vertical columns that extend upwardly from chassis 110. The panels 330, 340, and 350 can include bosses 180 on their inboard surfaces (as described above, not shown in FIGS. 19-30) such that fasteners extend through the vertical columns and into the bosses 180.

Each side panel 330L and 330R includes a longitudinal lip 334L and 334R on its lower edge that overlaps corresponding upper longitudinal lips 234Lu and 234Ru of lower side panel 230.

Front panel 340 includes a transverse lip 348 on its lower edge that overlaps a transverse lip 248u on the upper edge of lower front panel 240. Front panel 340 also includes forward-looking window 341 that is sealed by a gasket about widow 341. The gasket and window 341 is supported by and/or sealed to an upper edge of lower front panel 240. For this reason, the portion of front panel 240 that engages the gasket and window 351 preferably includes features to engage the gasket, which can be of any type and are well known.

Rear panel 350 includes a transverse lip 358 on its lower edge that overlaps a transverse lip 258u on the upper edge of lower rear panel 250. Rear panel 350 also includes rearward-looking window 351 that is sealed by a gasket about window 351. The gasket and window 351 are supported by and/or sealed to an upper edge of lower rear panel 250. For this reason, the portion of rear panel 250 that engages the gasket and window 351 preferably includes features to engage the gasket, which can be of any type.

Side panels 330L and 330R also include lateral lips 336L and 336R on their fore and aft edges. Front panel 340 includes left and right lateral lips 346L and 346R that engage in an overlapping relationship with the corresponding front lateral lips 336L and 336R of the side panels. Rear panel 350 includes left and right lateral lips 356L and 356R that engage in an overlapping relationship with the corresponding rear lateral lips 336L and 336R of the side panels.

In this regard, windows 341 and 351 are sealed with gaskets to prevent water ingress at the location of the electronic navigation sensors and other electronic components behind the windows. In the embodiment shown in the figures, the overlapping lips of the lower panels 220, 230, 240, and 250 and the overlapping lips of the upper panels 330, 340, and 350 (that is, the lips between all the panels) can be without gasket or additional seal. The overlapping longitudinal, transverse, and lateral lips inhibit water ingress, but will be imperfect. For example, rain driven sideways by wind in the right orientation can find a path around the overlapping lateral lips 236, 246, 256, 336, 346, and 356. Water can also find its way through longitudinal lips 234, 244, 254, 334, 344, and 354, as well as overlapping transverse lips 246, 256, 346, and 356. Water ingress through overlapping lips is exacerbated by wind and splashing, as well as imperfect contact between the overlapping lips due to tolerances of the polymer panels, thermal expansion and contraction of the panels, shrinkage and deformation of the panels over time, and other possible parameters.

As AGV 10 (optionally) foregoes sealing between the panels, AGV 10 copes with water ingress through shells 210 and 301 by letting the water flow or drip down inboard surfaces of the panels to a lowermost point on the AGV at barrel 245, at which drain 306 is located.

Within AGV 10, beneath lid 40, cargo bay 30 holds packages or other payload. Cargo bay 30 includes a bottom 32b, sidewalls 32s, and a flange 32f that extends outwardly from a periphery of the tops of sidewalls 32s. Cargo bay 30 is approximately cuboid chamber with an open top. Flange 32f can be supported by any portion upper body 12. For example, a landing 26 provides a surface for the underside of flange 32f to rest. A gasket 28 between landing 26 and flange 32f inhibits water from leaking through the gap between the flange and the landing.

When lid 40 is in the open position, water can enter into cargo bay 30, which can harm the package or other payload within lid 40. Dimples 34 are formed in the bottom surface 32b of the cargo bay. The dimples are raised (that is, in relief or embossed) relative to the rest of the surface of 32b, which raised dimples can elevate a package from the water on the surface 32b to eliminate or minimize contact with water. Dimples 34 may be formed of a variety of shapes, including curved and flat surfaces. Further, bottom surface 32b is sloped downwardly to a lowermost point of the cargo bay to a cargo bay drain 36. A tube or hose (not shown) is attached to cargo bay drain 36 and extends to or near main drain 306 to transport water from the cargo bay to the drain.

AGV 10 can also include a hold-down mechanism, such as electromagnets 90, that help retain lid 40 is its down and secure position. Electromagnets 90 illustrate a hold-down mechanism, and the present invention encompasses other hold-down mechanism, such as any structure that requires a water ingress solution, such as a releasable latch or like mechanism.

Electromagnet 90 protrudes through a hole in flange 32f, and thus can create a place for water ingress between the edge of the hole and electromagnet 90, and into the interior of AGV 10. Hold-down mount 60 for catching water ingress at the electromagnet 90 includes a landing 61, an enclosed body 62, flanges 64, and a drain 66.

Electromagnet 90 is supported by landing 61, which is a platform or floor within body 62. Body 62 is affixed to the underside of the landing 26 or other structure of upper body 12 by any fasteners or other means. All of the interior of body 62 slopes to a lowermost point of the mount, where drain 66 is located. A tube or hose (not shown) is attached to mount drain 66 and extends to or near main drain 306 to transport water from the cargo bay to the drain.

As illustrated in FIGS. 27 1, 19, 21, and 27B, lid 40 slopes downwardly towards is periphery 42. A lip of periphery 42 of the lid engages a downwardly sloping top cover 22 of AGV 10, which tends to shed water from the lid. Lid 40 includes a D hinge assembly 44 that includes an actuator for opening and (optionally) closing the lid. In some embodiments, hinge assembly 44 protrudes through cover 22 (as it is a moving component) and 32 does not have a seal fully around hinge assembly 44. Accordingly, a hinge drain 50 assembly is located beneath hinge assembly 44.

Hinge drain assembly 50 includes a funnel 52a and a drain pan 52b, which can be affixed to any structure, such as the rear panel 350 and/or cover 22. After water enters the funnel 52a and pan 52b, it flows down the sloped floor of the pan to hinge pan drain 56. A hose (not shown in the figures) carries water from pan 52b to main drain 306.

As best illustrated in FIGS. 4-5 and 28-30, a cooling air path 310 also handles water ingress. Air path 310 includes an inlet air path 310i and a discharge air path 310d. In this regard, cooling air is drawn into the bottom of the lower body at a set of front inlet holes 320i and discharged after exchanging heat with heat-generating components, such as motor controllers, within the lower body via rear outlet holes 320d. Inlets and outlets 320i and 320d are formed in bottom panel 220. The cooling air inlet and outlet are formed respectively at the front and rear in the embodiment shown in the figures. Other orientations and configurations are contemplated.

Above air inlet 320i, ribs 322i on an inboard side of panel 220 form longitudinal and side walls of air path 310i. An underside surface 324i of chassis bottom wall 120 forms an upper wall or boundary of the air path. An opening 326i in the chassis bottom wall 120 receives air flowing though air path 310i. Opening 326i is offset (that is, vertically not aligned) with air inlet 320i, thereby forming a bend 312i.

Above air outlet 320d, ribs 322d on an inboard side of panel 220 form longitudinal and side walls of air path 310d. An underside surface 324d of chassis bottom wall 120 forms an upper wall or boundary of the air path 310d. An opening 326d in the chassis bottom wall 120 permits air to enter into air path 310d. Opening 326d is offset (that is, vertically not aligned) with air outlet 320d, thereby forming a bend 312d. Bends 312i and 312d inhibit water from entering lower body 110 above the openings 326i and 326d in chassis wall 120, as even splashed water does not have a straight path through the openings.

Air outlet discharge path 310d is near main drain 306. A portion of air discharge openings 320d are on a downward sloping portion of bottom panel 220. Thus, an aperture 329 is formed on the rearmost wall 322d to permit water trapped in air discharge path 310d to flow down the interior of barrel 245 to main drain 306.

According to another aspect of the disclosure, a delivery autonomous ground vehicle (AGV) includes a lower body thermal management system and an upper body thermal management system. The upper and lower thermal management systems can be wholly separate such that each is a discrete system, such as with respect to air flow path (including each having its own ambient air inlet and cooling air outlet) and components. The lower body 112 houses high heat dissipating components, which are referred to here as "heat-generating" components, such as a power distribution board, voltage regulators, and motor controllers. The term "heat-generating components" excludes sensors, such as image sensors, that generate a low level of heat compared with the power components. The lower body can also include logic and communications components on or near the power distribution board in the lower body 112. Thus, a lower body cooling system provides cooling for the heat-generating components to for protection of the heat-generating components themselves and to remove heat from the interior of AGV 10 that could harm sensors, cameras, and other electronic components that can be negatively affected by high temperatures.

Sensors, cameras, and other components housed in upper body 12, in many cases, do not dissipate as much heat as the heat-generating components, yet cooling air is provided to the electronic components in the upper body 12, as some electronic components can be sensitive to high temperature. Often, the heat-generating components and the electronic components have internal thermal overload protection built into the components.

Discrete direct and indirect thermal management systems are illustrated. Other configurations, such as employing only one of an indirect and a direct cooling system may be employed. In some circumstances, having upper and lower cooling systems is an advantage, such as eliminating alignment for ducts that span between the upper and lower body portions. The advantages or solutions described are not intended to limit the scope of the invention, as the inventors and persons familiar with the technology in view of the specification will understand many uses for the claimed or disclosed structure that do not depend or related to the advantages.

A delivery AGV can include a lower body, an upper body, an indirect lower cooling system, and a direct upper cooling system. The lower body includes a chassis and an exterior lower body skin attached to the chassis. The upper body includes an exterior upper body skin. The upper body is in combination with the lower body such that the delivery AGV is adapted for carrying packages for delivery to an intended address.

Referring to FIGS. 1 and 31-46 seq., AGV 10 includes upper thermal management system 400 and lower thermal management system 500. The direct upper cooling system cools electronic components housed in the upper body, and includes at least one thermal duct adapted for supplying ambient air into the upper body cavity. The upper cooling system can include a left thermal duct and a right thermal duct, each one of the left and right thermal ducts receives ambient air (such as from a shoulder or wheel well in the lower body skin), includes a forward-facing outlet and a rearward-facing outlet; and includes one or more internal bends. The bends may be formed by structure of the thermal duct (that is, bends, elbows or like structure formed in the shape of the duct itself) and/or by baffles with in the thermal duct.

One or more fans are provided to move air though the thermal ducts, into the cavity within AGV 10 in contact with front and rear sensors and other components, and preferably out through arrays of perforation vents or perforation outlets about the top of the upper body. The upper cooling system is referred to as direct in that air flow is unrestricted by a duct within the cavity of the AGV after exiting the thermal duct.

Upper thermal management system 400, as best illustrated in the FIGS. 31, 33, 41-46, includes separate, identical (except opposite hand) systems, including left and right thermal ducts 410L and 410R.

When referring to a particular one of the left or right aspects or components of the system, the letters L or R are appended to the reference number. When referring to either system or to both, the reference number is not appended. For example, thermal system 400 encompasses both right and left thermal ducts 410L and 410R. And "thermal duct 410" is used when referring to the structure of the thermal duct when it is unimportant to distinguish between left and right. Further, the letters i and d are appended to reference numbers to indicate an inlet and discharge portion. For example, thermal duct 410 includes air inlets 410i and air discharge openings 410d.

Upper thermal management system 400 includes ambient air inlet holes 410i (FIG. 33) and a thermal duct 410 for receiving air from air inlet holes 410i. Ambient air inlet holes 410i are in the wheel wells 339L and 339R formed in lower body side panels 330L and 330R. As illustrated in the figures, inlet holes 410i are in the portion of the wheel wells 339 that are nearly horizontal, and generally downward-facing, to inhibit wind-blown precipitation from entering into air inlets 410i and for aesthetic reasons.

Figure 44:
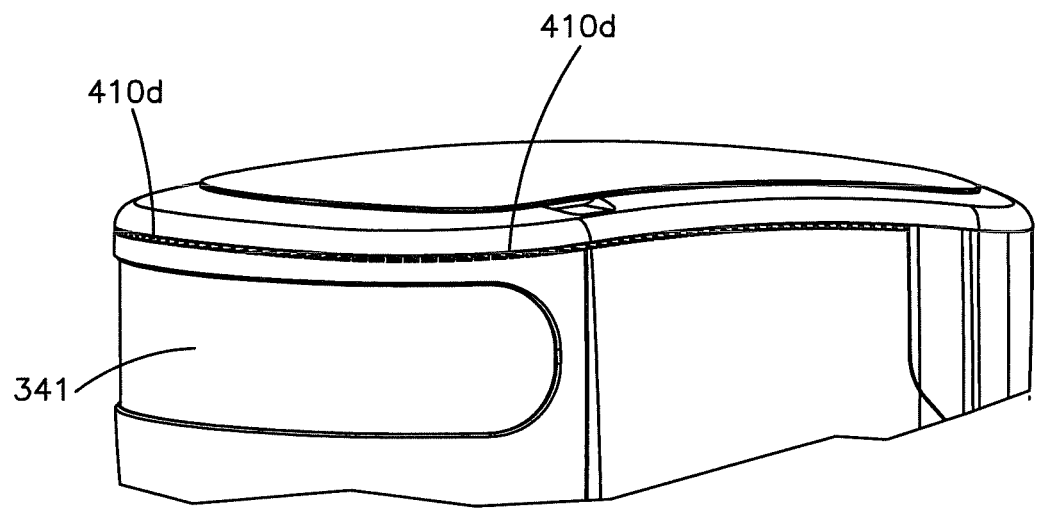
FIG. 44 is an enlarged perspective view of a portion of the upper body of the AGV, illustrating the array of perforation outlets of the upper thermal management system.

Thermal duct 410 includes an intake region 420 and a bifurcated outlet region 440. Intake region 420 is in contact with an inboard surface of side panel 330 about air inlet holes 410i. Intake region 420 is shaped to include a bend 422 and includes baffles 424, as best illustrated in FIG. 44. Bend 422 and baffles 424 inhibit or block water that may be splashed or blown into air inlet holes 410i from entering deeply into thermal duct 410.

A pair of axial fans 490 are located in intake region 420 above bend 422 and baffles 424. Fans 490 are face upwards to induce or draw air in through inlets 410i.

The outlet region 440 of thermal duct 410 mates to the intake region 420 to receive ambient air at the outlet of fans 490. Outlet region 440 branches or bifurcates into front and rear branches 442F and 442R, which have corresponding outlets 410d. The outlets 410d are generally angled to correspond with the intended flow direction around cargo bay 30 and to the front and rear electronic components proximate windows 341 and 351.

The sensors (not shown in the figures for clarity) can include cameras (which can include images sensors and image signal processing components), light sensors and the like, speed sensors, and like components that are positioned behind windows 341 or 351 for enabling sight and navigation, for convenience, or other reasons. Often, the sensors and other components are sensitive to high temperatures. Further, the window material may transmit heat through thermal radiation.

Accordingly, cooling air from thermal ducts 410 enters the cavity of AGV 10 (such as between skins 210, 301 and the bottom or non-public surface of cargo bay 30.) As explained above, the once-through air flow, in which cooling air moves about within the interior space or cavity of AGV 10 in contact with sensors and electronic equipment in referred to herein as a direct cooling system.

Figure 45:
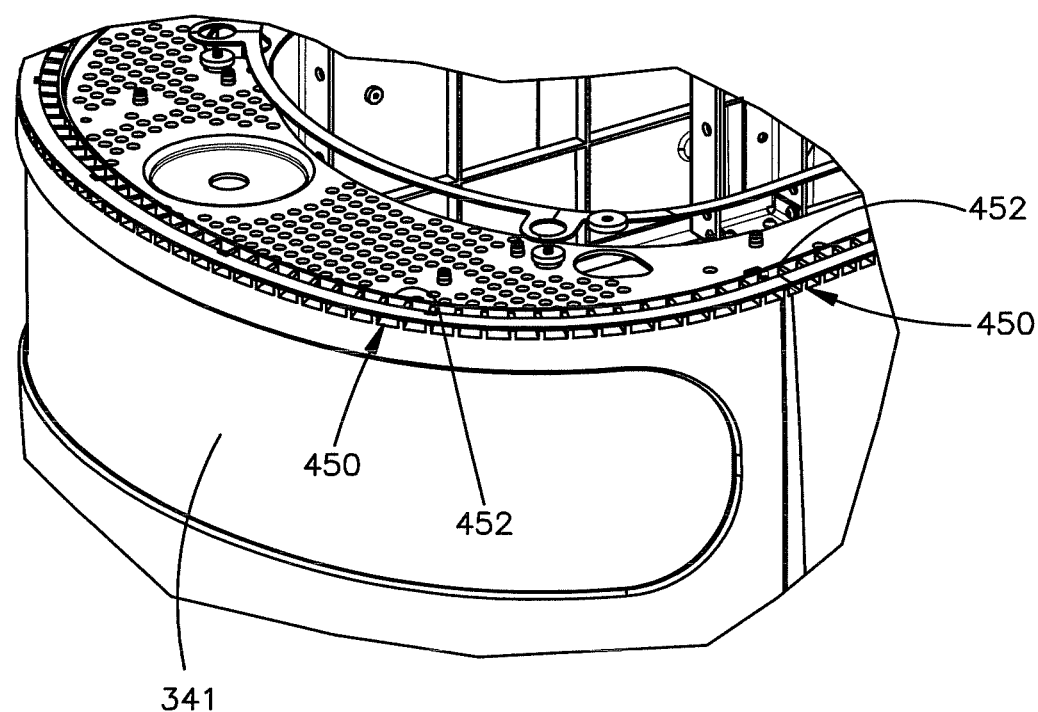
FIG. 45 is another enlarged perspective view of the array of perforation, with parts removed for clarity.

The cooling air from thermal ducts 410 exit from the cavity of the AGV through an array of perforation outlets 410*d* formed near at or near the upper ends of the upper body side panels 330L and 330R, front panel 340, and rear panel 350, as best illustrated in FIGS. 44 and 45. The perforation outlets are small through holes.

Referring to FIG. 45, each perforation can include an opening 450 that is flush with the face of the panel 330, 340, and 350, and a rear wall 452. Rear wall 452 inhibits water splashed into or blown into opening 450 from entering into the cavity of the AGV. Perforation outlets are illustrated as the means for enabling cooling air to exit from AGV 10. Other structures are contemplated.

In operation (using only one side of the systems 400L and 400R for illustration), ambient air is drawn or induced by fans 490 through openings 410*i* in the wheel well portion of side panel 330 into the intake region 420 and past bend 422 and baffles 424. After passing through the fans, the air enters into bifurcated branches 442F and 442R where is turns 90 degrees from generally vertically upward to fore and after according to the bifurcation.

Air exiting thermal duct at forward exit 442F flows generally forward between the skin 301 and the cargo bay 30, encountering the sensors and other electronic components at the front of AGV 10, such as those behind front window 341, cooling the sensors by forced convection or other heat transfer mechanism. Air exits through perforation outlets 410*d* primarily toward the front of AGV 10.

Air exiting thermal duct at rearward exit 442R flows generally rearward between the skin 301 and the cargo bay 30, encountering the sensors and other electronic components at the rear of AGV 10, such as those behind rear window 351, cooling the sensors by forced convection or other heat transfer mechanism. Air exits through perforation outlets 410*d* primarily toward the rear of AGV 10. The cooling system is referred to as direct, as the air is free to contact the components directly.

In the embodiment of the figures, two conventional cooling fans 490 each operate below capacity, such as roughly 50% of maximum continuous power draw, for noise reasons and to prolong their life.

The indirect lower cooling system, as illustrated best in FIGS. 31-40, cools heat-generating components housed in the lower body. The lower cooling system is indirect to the extent that lower system cooling air does not envelope the heat-generating components and does not flow through the internal void of AGV 10. In this regard, the heat exchange duct separates the heat-generating components from lower cooling system cooling air. In some cases, heat-generating components can extend through openings in the heat exchange duct. Preferably, the openings are sealed such that lower cooling air is ducted to the outside without entering the internal of the AGV.

Heat exchange elements, such as fins, are in thermal contact with the heat-generating components (that is, the heat exchanger components are in physical contact with the heat-generating components or are in direct contact with sheets or non-insulating structures that are in direct contact with the heat-generating components).

Lower cooling system includes an intake region for supplying ambient air to the heat exchange duct and an outlet region for discharging cooling air. The heat exchange duct includes heat exchange elements in the cooling air flow in thermal contact with the heat-generating components. The lower cooling system includes one or more fans for moving cooling air through the heat exchange duct.

Lower thermal management system 500 includes the ambient air intake region 310*i*, the cooling air discharge region 310*d*, and heat exchange duct 510. Intake region 310*i* and discharge region 310*d* preferably are as described above. Heat exchange duct 510 includes an upper wall 512 and a lower wall 514 that are enclosed by sidewalls 516. Duct 510 also includes an inlet portion 520*i* and an outlet portion 520*d* each of which has an elbow or turn, as illustrated.

Duct 510 has inlet and outlet flanges 522*i* and 522*d* that are fastened to chassis bottom wall 120 at chassis openings 326*i* and 326*d*, respectively. A pair of axial fans 590 are located in duct 510—in the inlet portion 520*i* in the embodiment of the figures. A gasket 523*i* seals between opening 326*i* and inlet flange 522*i*, and a gasket 523*d* seals between opening 326*d* and outlet flange 522*d*. Gasket 523*i* inhibits air leakage from the interior cavity of the AGV into duct 510 on its inlet side, as gasket 510 is on the inlet side of fans 590. Gasket 523*d* inhibits air leakage from the interior of duct 510 into the cavity of AGV 10, as gasket 523*d* is on the outlet side of fans 590.

Figure 37:
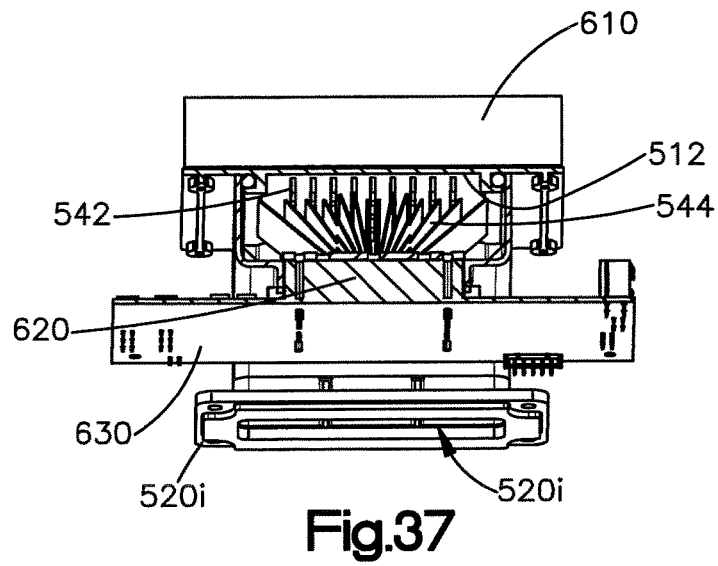
FIG. 37 is a transverse cross sectional view of the lower thermal management system, illustrating internal portions of the heat exchange duct.
Figure 38:
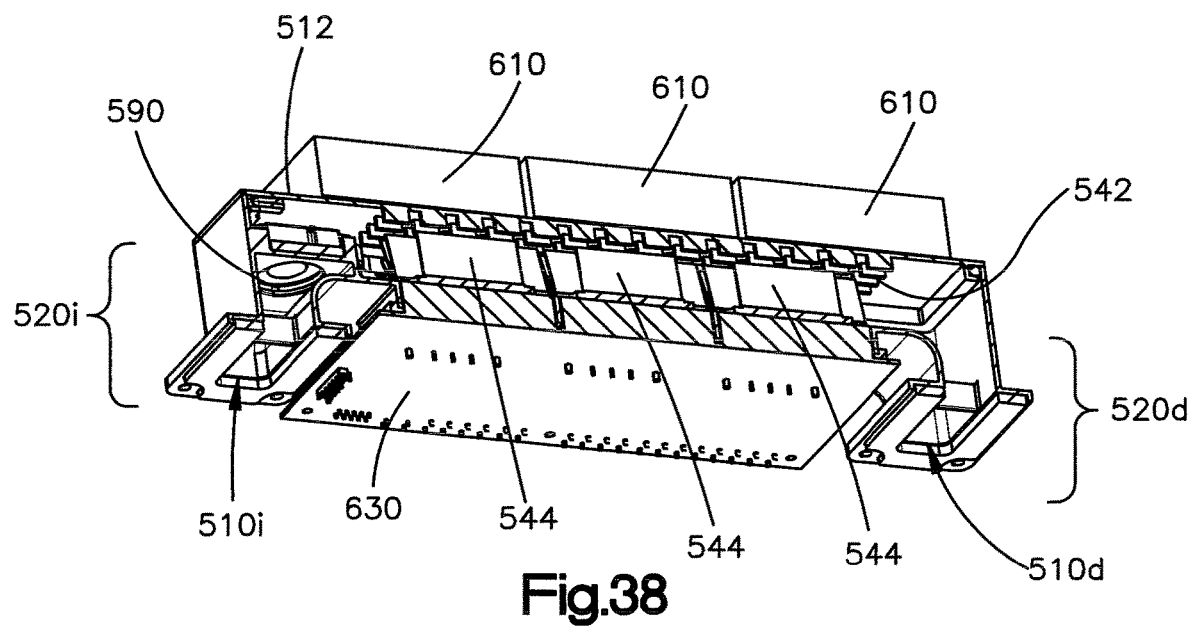
FIG. 38 is a longitudinal cross sectional view of the lower thermal management system, illustrating internal portions of the heat exchange duct.
Figure 39:
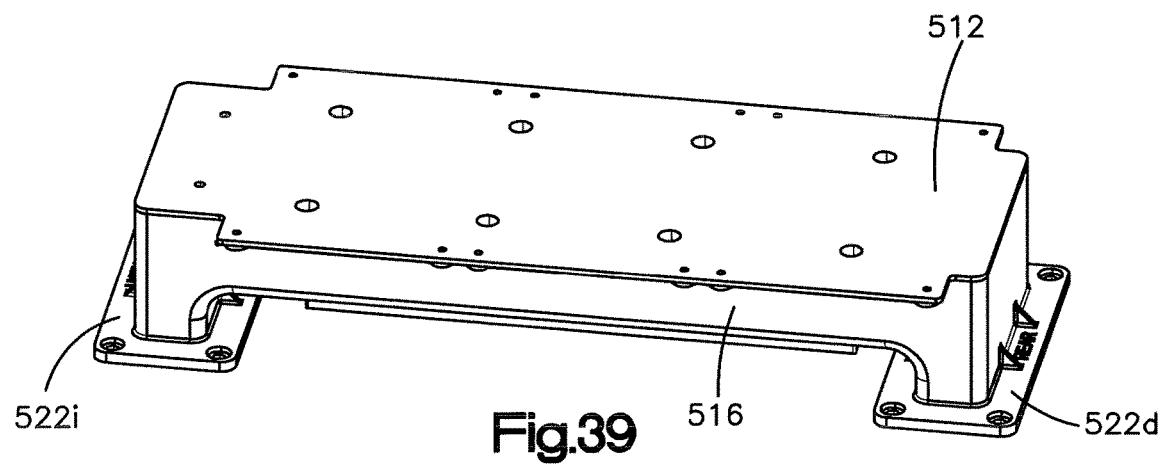
FIG. 39 is a top perspective view of the heat exchanger duct removed from other components.

The heat-generating components that cooled by lower cooling system 500 include motor controllers 610 and voltage regulators 620. Voltage regulators 620 may be controlled by a power board 630. Many configurations are contemplated. As illustrated in FIGS. 31-34, lower cooling system components are located at or near the bottom of the chassis, beneath batteries 92. Thus, batteries 92 can be accessed from the top after removing cargo bay 30. In the embodiment of the figures, motor controllers 610 are in contact with outboard surface of upper wall 512. The inboard surface of upper wall 512 includes fin or pin type heat exchange elements 542 protruding into the air path with duct 510, as best illustrated in FIGS. 37 and 38.

Figure 40:
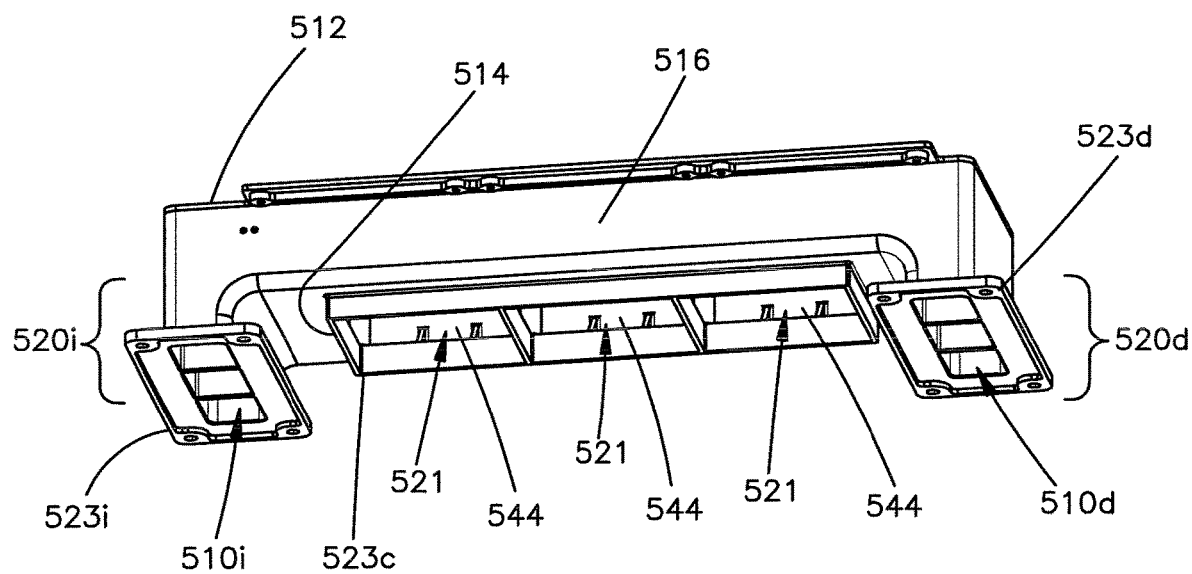
FIG. 40 is a bottom perspective view of the heat exchanger duct removed from other components.
Figure 41:
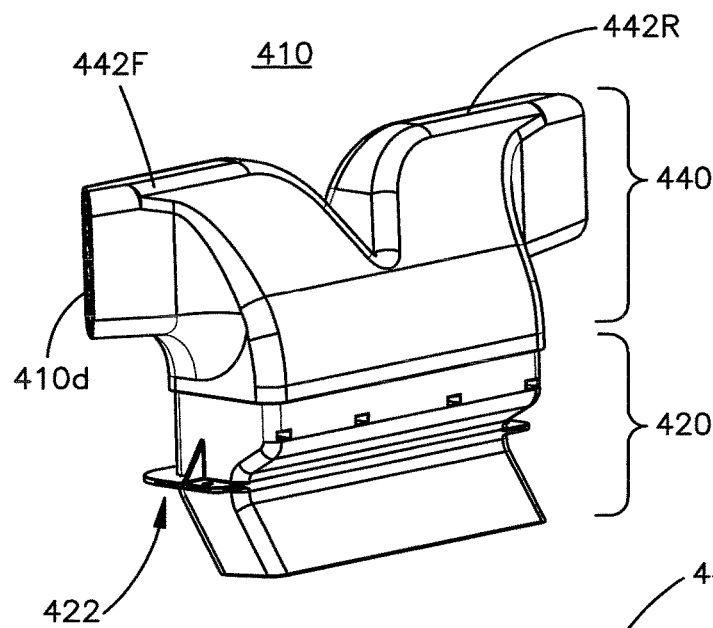
FIG. 41 is a perspective view of the thermal duct portion of the upper thermal management system.
Figure 42:
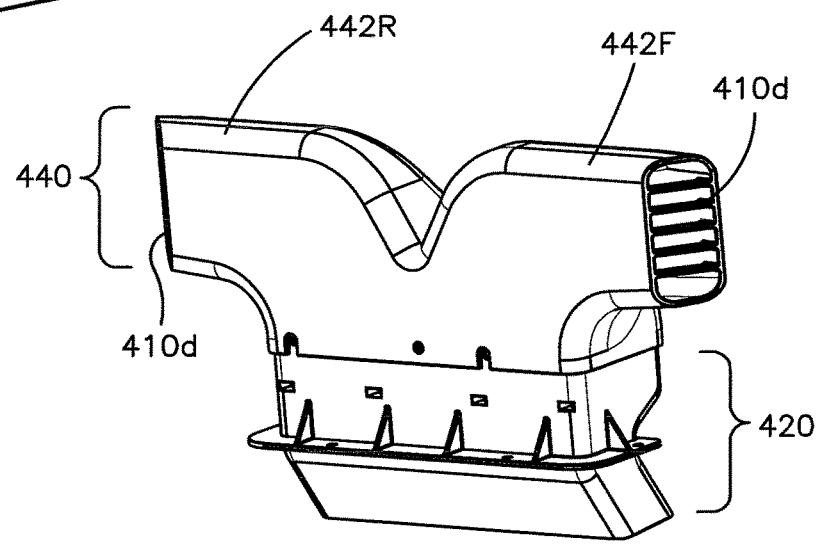
FIG. 42 is an opposing perspective view of the thermal duct of FIG. 41.
Figure 43:
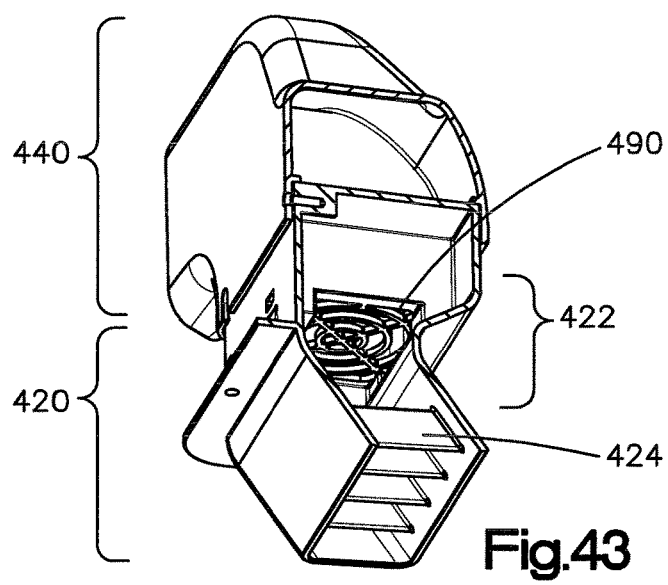
FIG. 43 is a bottom, perspective, cross sectional view of the thermal duct of FIG. 41.

In the embodiment of the figures, voltage regulators 620 protrude through openings 521 in lower wall 514. FIG. 40 illustrated the openings into which the voltage regulators 620 protrude to contact an underside of heat sinks 544. A gasket 523*c* forms a seal around voltage regulators 620, as the duct 510 (in the embodiment of the figures) in the region of the voltage regulators is under positive pressure, as fans 590 are on the inlet side of duct 510. Gaskets 523C, which can be of any type (as well known in the art) between the openings 521 and voltage regulators 620 inhibit air from leaking from duct 510 into the cavity of AGV 10. Heat exchangers or heat sinks 544 are mounted onto the top plates of voltage regulators 620 to conduct heat from components 620 into the fins of the heat sinks for transfer into the cooling air flow by forced convection.

In operation, ambient air entering intake region 310*i* passes into the heat exchange inlet portion 510*i*. Ambient air is drawn or induced by fans 590 through openings 320*i* in the lower body shell 210, through the bend 312*i* in intake region 310*i*, and through chassis opening 326*i*. After passing through the chassis bottom wall, air enters into heat exchange duct inlet portion 510*i* and through fans 590.

In the embodiment of the figures, two conventional cooling fans 590 each operate below capacity, such as roughly 50% of maximum continuous power draw, for noise reasons and to prolong their life.

Air exiting the fans 590 turns 90 degrees from vertically upward to horizontal and then flows over heat sink elements 542 and 544, which elements transfer heat to the cooling air. Once past the heat sink elements, the cooling air makes another 90 degree turn from horizontal to vertically downward. Cooling air exits duct 510 through chassis apertures 326*d*, through duct discharge portion 510*d*, and out of AGV 10 via discharge apertures 310*d* in bottom panel 220.

Duct 510 is referred to herein as a closed duct, and the system is referred to herein as an indirect cooling system, as air passes through duct 510 without entering into the cavity of AGV 10. Rather, the cooling air in lower thermal system 500 encounters only interior passages, heat sink elements, and (optionally) the surfaces of components (such as voltage regulators) 620, without freely flowing into other portions of the interior of AGV 10.

The bends disclosed herein may be in any combination and take any structure, and are generally chosen to have a small pressure drop for reasons of economy of power. The term "bend" as used herein can refer to a deviation from a linear path created by the shape of the duct itself, and also encompasses bends in airflow created by baffles placed in the air path. Thus, the term "bend" as used herein refers to a deviation in the airflow from straight line, and is not limited to a single bend, but rather broadly encompasses slight jogs and tortuous paths.

To illustrate a use and control system of AGV 10 to put the chassis and skin combination in context, a power system (not shown) can be housed in chassis and can include a power supply, such as conventional rechargeable batteries, and an electric motor to provide power to the wheels. The control system may power both the left and right motors at equal speed to propel AGV 10 in a straight line, may power one motor at a higher speed to turn AGV as needed, and may power the drive wheels in opposing directions to rotate AGV 10 without translation (that is, rotate in place). The control algorithms for controlling the straight-ahead movement, turning, and rotating AGV 10 are well known, as will be understood and employed by persons familiar with battery powered vehicles.

An AGV, both in general and in the context of a delivery AGV disclosed herein, in an uncontrolled, unprotected environment may have the ability to:
  access information about the environment (such as maps of streets, sidewalks, and buildings, and in some cases building interiors);
  detect people, obstacles (such as curbs, steps, bumps, slopes, and the like), objects (such as landscaping, gates, and the like), and surfaces (such as lawns, cobblestones, sidewalk cracks and discontinuities, and the like), and then evaluate and take action based on the detection; and
  travel under its own power to waypoints, usually by battery power and without human navigation assistance, taking into account the above information and detection.

In some circumstances, an AGV's onboard control system may be able to autonomously learn, such as adjusting strategies based on input about the surroundings, adapt to surroundings without outside assistance, and the like.

A particular subset of autonomous ground vehicles is an AGV that navigates to a desired residential or commercial location to carry an object, such as a package containing a commercial product. For example, United States Patent Publication Number 20180024554, titled "Autonomous Ground Vehicles Based At Delivery Locations," which is assigned to the assignee of the present invention, discloses AGVs that retrieve items from transportation vehicles (e.g., delivery trucks) for delivery to specified locations (e.g., user residences, a commercial business, etc.). In various implementations, the AGVs may be owned by individual users and/or may service a group of users in a given area (e.g., in an apartment building, neighborhood, etc.). The AGVs may travel out (e.g., from a user's residence, apartment building, etc.) to meet a transportation vehicle (e.g., a delivery truck on the street) to receive items, and may be joined by other AGVs that have traveled out to meet the transportation vehicle, and may line up in a particular order (e.g., according to delivery addresses, etc.). After the items are received, the AGVs may travel back (e.g., to the user residences) to deliver the items, and may be equipped to open and close access barriers (e.g., front doors, garage doors, etc.). The AGV may also be equipped with a locked lid that can be opened only by an intended recipient.

The present invention uses the phrase "delivery AGV" or "AGV for package delivery" or other combinations of the terms "AGV" and "delivery" to refer to AGVs having the structure, capabilities and function to navigate to a desired location, such as by navigating public or private sidewalks or neighborhoods, to transport a package to a desired customer or residential or commercial location. Accordingly, a delivery AGV includes an internal chamber for holding a package payload and is limited in speed, such as to 6 mph, 10 mph, or 15 mph, as determined by the particular design guidelines and possibly by state regulation. In this regard, the above velocities are referred to herein as low speed.

The control system includes sensors and other components and systems used for navigation and guidance, avoiding objects, image-capture and sensing, power management, communications, security, and other functions inherent in achieving the goals of a delivery AGV. Sensors can be mounted behind the forward-facing panel and/or a rearward-facing panel. Sensors can include cameras having images sensors including image signal processing, light sensors, and the like, with corresponding processing including image decoding, lens correction, geometrical transformation, video stream transcoding, video analytics, image capture, and compression to provide obstacle detection and obstacle identification. Sensors for determining speed may also be employed. Panels can be transparent polymer, such as (for example) acrylic, Plexiglas, or polycarbonate.

Sensors can include RADAR sensors, such as SRR (Short-range radar) applications and MRR/LRR (mid-range radar, long-range radar) applications; LIDAR sensors, such as infrared LIDAR systems that with the aid of a Micro-Electro-Mechanical System (MEMS), which use a rotating laser, or a solid-state LIDAR. Control system can also include GPS modules, inertial guidance modules such as an inertial measurement unit (IMU) having gyroscopes and accelerometers (preferably in each of the x, y, and x directions), power management modules to control power, overall consumption, and thermal dissipation. Other modules, components and functions are contemplated.

Control system and sensors may also be employed in controlling the driving and turning of AGV 10 during normal conditions. For example, a speed sensor on the wheels, sensors on motor current and/or voltage, GPS, accelerometer, gyroscope, optical sensors, and the like may be employed to determine a safe straight-ahead speed, safe turning radius and velocity for the vehicle and package (taking into account the possibility of encountering a person who might not see or be expecting the vehicle), safe stopping distance to provide feedback to the controller for determining the speed, and the like.

Control system may also include a package delivery module and corresponding sensors. For example, a sensor can be associated with a closed position of lid to assure that a package to be delivered to a residential or commercial destination is secure in chamber during transport. A means for unlocking a lock on lid (or unlocking a actuator for lid or like means) can include a keypad, a wireless communication system (for working with Wi-Fi, cellular data, Bluetooth, NFC or other communication means to send a signal to the lock upon verification), a facial or fingerprint recognition module, or the like may also be included.

Control system can control the movement of AGV to a desired destination, the delivery of a package within chamber to an authorized recipient, and/or movement of AGV 10 to a home location. In this regard, the description of control system and sensors, and United States Patent Publication Number 20180024554 and/or industry practice in view of the present disclosure may inform the functions in this regard.

Throughout the specification, reference numbers are used to structure or components. A letter is appended to refer to particular ones of the structure or component. For example, the letters L or R are appended to the reference number when referring to left and right versions; the letters i or d are appended to the reference number when referring to inlet and discharged versions. When there are reference numbers using an appended letter, the bare reference number (without appended letter) is used to refer to the structure generally or as a whole.

The present invention is illustrated employing particular structure and function. The present invention is not limited to the structure and function specifically described herein. Rather, person familiar with the technology will understand variations encompassed by the description. According, it is intended that the claims be given their full scope.

We claim:

1. A delivery autonomous ground vehicle (AGV) having a direct thermal management system for high heat-generating components, and an indirect thermal management system for heat-sensitive electronic components, the AGV comprising:
   a body including an upper body and a lower body;
   the lower body including a chassis and an exterior lower body skin attached to the chassis,
   the upper body including an exterior upper body skin, the upper body being in combination with the lower body such that the delivery AGV is adapted for carrying packages for delivery to an intended address;
   the indirect thermal management system adapted for cooling heat-generating components housed in a first portion of the body, the indirect thermal management system including a heat exchange duct that separates the heat-generating components from the indirect thermal management system cooling air; and
   the direct thermal management system adapted for cooling heat-sensitive electronic components housed in a second portion of the body, the direct thermal management system including at least one thermal duct adapted for supplying ambient air into the second portion of the body.

2. The delivery AGV of claim 1 wherein the indirect thermal management system includes an intake region adapted to supply ambient air to the heat exchange duct and an outlet region adapted to discharge cooling air, the heat exchange duct including heat exchange elements in the cooling air flow in thermal contact with the heat-generating components.

3. The delivery AGV of claim 2 wherein the direct thermal management system includes a left thermal duct and a right thermal duct, each one of the left and right thermal ducts:
   being adapted to receive ambient air;
   having a forward-facing outlet and a rearward-facing outlet; and
   having at least one bend.

4. The delivery AGV of claim 3 wherein the direct thermal management system is located in the upper body and includes at least one fan, and wherein the indirect thermal management system is located in the lower body and includes at least one fan.

5. The delivery AGV of claim 4 wherein the at least one direct thermal management system fan includes a pair of fans, each direct thermal management system fan adapted to operate at reduced capacity, and the at least one indirect thermal management system fan includes a pair of fans, each indirect thermal management system fan adapted to operate at reduced capacity.

6. A delivery autonomous ground vehicle (AGV) having a lower body thermal management system, the AGV comprising:
   a body including a lower body and an upper body;
   the lower body including a chassis and exterior lower body skin attached to the chassis,
   the upper body in combination with the lower body such that the delivery AGV is adapted for carrying packages for delivery to an intended address;
   heat-generating components housed in the body; and
   an indirect cooling system including an air intake region, an air discharge region, a heat exchange duct between the air intake region and the air discharge region;
   and at least one fan adapted to move air through the heat exchange duct;
   the air intake region including an inlet opening in the body, the inlet opening adapted for receiving ambient air flow therethrough; the air take region including an inlet bend;
   the air discharge region including an outlet opening in the body, the outlet opening adapted for discharging cooling air flow therethrough; the air discharge region including an outlet bend;
   the heat exchange duct being adapted to receive cooling air from the air intake region and discharge cooling air to the air discharge region, the heat exchange duct being enclosed such that cooling air does not directly contact the heat-generating components, the cooling duct including heat exchange elements in the cooling air flow and in thermal contact with the heat-generating components.

7. The delivery AGV of claim 6 wherein the heat-generating components include motor controllers in thermal contact with a first heat sink adapted to transfer heat from the motor controllers to the cooling air.

8. The delivery AGV of claim 7 wherein the heat-generating components further include voltage regulators in thermal contact with a second heat sink adapted to transfer heat from voltage regulators to the cooling air.

9. The delivery AGV of claim 8 wherein heat exchange elements of the first and second heat sinks include fins that extend into the cooling air flow.

10. The delivery AGV of claim 9 wherein the indirect cooling system is housed in the lower body, each one of the air intake region and the air discharge region is beneath a bottom wall of the chassis, the heat exchange duct is above the bottom wall of the chassis, the inlet opening is formed in the lower body skin, and the outlet opening is formed in the lower body skin.

11. The delivery AGV of claim 10 wherein each one of the inlet opening and the discharge opening is formed on an underside of the lower body.

12. The delivery AGV of claim 6 wherein the at least one fan is an axial fan located in the heat exchange duct.

13. The delivery AGV of claim 6 wherein the air intake region is forward of the air discharge region.

14. The delivery AGV of claim 6 wherein the cooling duct is on the longitudinal centerline of the delivery AGV.

15. A delivery autonomous ground vehicle (AGV) having an upper body thermal management system, the AGV comprising:
   a body including a lower body and an upper body;
   the lower body including a chassis and exterior lower body skin attached to the chassis,
   the upper body including an exterior upper body skin, the upper body being in combination with the lower body such that the delivery AGV is adapted for carrying packages for delivery to an intended address;
   electronic components housed in the upper body;
   at least one thermal duct, each thermal duct:
      being adapted to receive ambient air;
      having a forward-facing outlet and a rearward-facing outlet;
      having at least one bend;
   at least one fan adapted for moving air through the thermal duct;
   air outlets formed in body and adapted for discharging air from the thermal ducts after contact with the electronic components.

16. The delivery AGV of claim 15 wherein the at least one thermal duct includes a left thermal duct and a right thermal duct.

17. The delivery AGV of claim 16 wherein the lower body skin includes a pair of opposing side panels, each one of the side panels including a wheel well having an undercut surface, the left thermal duct having an air inlet in a left undercut surface, the right thermal duct having an air inlet in the right undercut surface.

18. The delivery AGV of claim 17 wherein the electronic components include front sensors and rear sensors.

19. The delivery AGV of claim 17 wherein the air outlets include a front array of perforation outlets in the upper body shell and a rear array of perforation outlets in the upper body shell.

20. The delivery AGV of claim 17 wherein the air outlets include a front array of perforation outlets in the upper body shell and a rear array of perforation outlets in the upper body shell, each one of the front array of perforation outlets and rear array of perforation outlets (i) being located near an upper edge of the upper body skin and (ii) including a bend.

* * * * *